United States Patent [19]
Hoshi

[11] Patent Number: 6,020,944
[45] Date of Patent: Feb. 1, 2000

[54] ILLUMINATION DEVICE AND LIQUID CRYSTAL APPARATUS INCLUDING SAME

[75] Inventor: Hiroaki Hoshi, Yokohama, Japan

[73] Assignee: Canon Kabushiki Kaisha, Tokyo, Japan

[21] Appl. No.: 08/763,631

[22] Filed: Dec. 4, 1996

[30] Foreign Application Priority Data

Dec. 5, 1995 [JP] Japan ................................ 7-316798
Nov. 22, 1996 [JP] Japan ................................ 8-312317

[51] Int. Cl.[7] .............................................. G02F 1/1335
[52] U.S. Cl. .............................. 349/62; 349/65; 362/31
[58] Field of Search ................................ 349/62, 63, 65; 362/31; 385/37; 359/256

[56] References Cited

U.S. PATENT DOCUMENTS

| | | | |
|---|---|---|---|
| 3,884,549 | 5/1975 | Wang et al. .............................. | 385/37 |
| 5,210,404 | 5/1993 | Cush et al. ............................... | 385/37 |
| 5,455,178 | 10/1995 | Fattinger .................................. | 385/37 |
| 5,587,816 | 12/1996 | Gunjima et al. ......................... | 349/62 |
| 5,729,311 | 3/1998 | Broer et al. .............................. | 349/65 |
| 5,808,709 | 9/1998 | Davis et al. .............................. | 349/65 |

FOREIGN PATENT DOCUMENTS

| | | | |
|---|---|---|---|
| 0 597 261 A1 | 5/1994 | European Pat. Off. ...... | G02F 1/1335 |
| 0 770 818 A2 | 5/1997 | European Pat. Off. .......... | F21V 8/00 |
| 7-199184 | 4/1996 | Japan ........................... | G02F 1/1335 |
| WO 97/08582 | 3/1997 | WIPO ........................... | G02F 1/1335 |

OTHER PUBLICATIONS

T. Gunjima, et al., "S32–2 New Back–Lighting Device for Liquid Crystal Displays", Proceedings of The 15th International Display Research Conference, Asia Display '95, pp. 731–734 (Oct. 16–18, 1995).

*Primary Examiner*—William L. Sikes
*Assistant Examiner*—James Dudek
*Attorney, Agent, or Firm*—Fitzpatrick, Cella, Harper & Scinto

[57] ABSTRACT

An illumination device is formed from a light-transmissive light guide member, and a light source disposed on a side of the light guide member to emit light to the light guide member. The light guide member is formed to include an anisotropic grating preferably at a boundary between an anisotropic member having a refractive index anisotropy and a substantially non-anisotropic member laminated on the anisotropic member. The anisotropic grating may be formed as a one-dimensionally arranged grating for causing selective diffraction of, e.g., an ordinary ray. As a result, the illumination device is caused to function as a planar light source emitting linearly polarized light of a uniform luminance distribution suitably used in combination with a transmission-type or reflection-type liquid crystal device to form a small-sized and thin liquid crystal apparatus.

26 Claims, 11 Drawing Sheets

ILLUMINATION DEVICE AND LIQUID CRYSTAL APPARATUS INCLUDING SAME

FIELD OF THE INVENTION AND RELATED ART

The present invention generally relates to an illumination device capable of realizing a uniform light quantity distribution, and a liquid crystal apparatus equipped with such an illumination device.

Liquid crystal apparatus may be roughly divided into a transmission type and a reflection type.

Among these, as shown in FIG. 1, a transmission-type liquid crystal an apparatus 1 includes a transmission-type liquid crystal panel $P_1$, behind which a backlight device $B_1$ is disposed. The backlight device $B_1$ includes light sources 2, such as cathode ray tubes, a light guide member 3 for guiding light from the liquid crystals 2 and a diffusion plate (not shown) so as to illuminate the liquid crystal panel $P_1$ at uniform luminance. On both side of the liquid crystal panel $P_1$, polarizer sheets 5 and 6 are applied.

On the other hand, as shown in FIG. 2, a reflection-type liquid crystal apparatus 10 includes a reflection-type liquid crystal panel $P_2$, in front of which a half mirror 11 is disposed on a viewer side. Opposite to the half mirror 11, an illumination device $B_2$ is disposed perpendicular to the liquid crystal panel $P_2$.

Herein, the liquid crystal panel $P_2$ comprises a substrate 12 carrying thereon TFTs (thin film transistors) and electrodes for pixel drive. On the surface of the substrate 12, pixel electrodes 13 are arranged two-dimensionally. These pixel electrodes 13 are composed of aluminum (Al), the surface of which has been mirror-finished to provide a pixel reflection surface and also a multitude of pixels. Along the substrate 12, a twisted nematic liquid crystal layer (TN-liquid crystal layer) 15 is disposed and, above the TN-liquid crystal layer, color filter segments 16 of three colors (R, G and B) are disposed corresponding to the pixel electrodes. In addition, the liquid crystal panel $P_2$ further includes a phase compensation layer, alignment films (of, e.g., polyamide), transparent electrodes (ITO), and a glass substrate (all not shown).

Further, the illumination device $B_2$ includes a light source, a reflection shade disposed to cover the light source so as to reflect light from the light source forwards, and a collector lens system (details not shown), so that it functions as a planar light source for emitting uniform luminance light.

Light from the light source $B_2$ is reflected by the half mirror 11 and then guided to the liquid crystal panel $P_2$ to illuminate the entire face of the liquid crystal panel $P_2$. Thereafter, the illumination light is reflected by the pixel electrodes 13 to be transmitted through the half mirror 11, thus being recognized as an image.

These reflection-type liquid crystal apparatus 10 and transmission-type liquid crystal apparatus 1 have respective advantages. However, a reflection-type apparatus allows a higher aperture ratio than a transmission-type apparatus by disposing TFTs and lead conductors behind the pixel electrodes 13, so that it allows a bright and high-luminance display, thus minimizing a power consumption.

Further, a reflection-type liquid crystal apparatus 10 is expected to realize a high-resolution display apparatus including a large number of pixels because of a high aperture ratio allowing a high-density pixel arrangement.

Further, as a transmission-type liquid crystal apparatus 1 is constituted so that light from the backlight device $B_2$ passes through two polarizers 5 and 6, the transmitted light quantity is reduced, thus making it difficult to provide a high-luminance image. In order to provide a high-luminance image, the backlight device $B_1$ requires an increased power consumption and an increased heat evolution. A reflection-type liquid crystal apparatus is free from these difficulties and can display a bright image.

However, a conventional reflection-type liquid crystal apparatus has required the above-mentioned disposition of a half mirror 11 and an illumination device $B_2$, so that it is liable to be large in size. For this reason, a display apparatus including a reflection-type liquid crystal apparatus has been realized only as a large size and special apparatus, such as a projection TV set, and it has been difficult to realize a small-sized light-weight liquid crystal apparatus, so-called a flat display.

Further, the illumination device $B_2$ has to be a planar light source emitting uniform luminance light, thus requiring a high heat evolution. Accordingly, an apparatus, such as a cooling fan, for heat dissipation is required, thus making the apparatus large in size and expensive.

On the other hand, as the transmission-type liquid crystal panel, the TFT-type ones are currently predominant but the transmittance thereof is very low as (low as several %). In general, such a display apparatus requires a luminance on the order of 80–120 $cd/m^2$ when it is used in a room, so that a TFT-type panel having a low transmittance as described above requires a high-luminance illumination device on the order of several thousands $cd/m^2$.

As such a high-luminance illumination device, one utilizing polarized light has been disposed in "New Back-Lighting Device for Liquid Crystal Displays", S32-2, Asia Display '95. However, the illumination device requires a large-area polarizing beam splitter and a wave plate having a polarization characteristic of a broad range covering a visible range, so that the production thereof is difficult. Further, in order to obtain desired characteristics, it is required to use lenticular lenses, a microlens array, a small-size beam splitter array, etc., so that the device becomes large in size and expensive.

SUMMARY OF THE INVENTION

Accordingly, an object of the present invention is to provide an illumination device of a high luminance and a uniform light quantity distribution, and a liquid crystal apparatus equipped with the illumination device.

Another object of the present invention is to provide an illumination device capable of economizing power consumption, and a liquid crystal apparatus equipped with the illumination device.

A further object of the present invention is to provide a liquid crystal apparatus capable of preventing the occurrence of image defects.

A further object of the present invention is to provide a small-size and light-weight reflection-type liquid crystal apparatus.

A further object of the present invention is to provide a reflection-type liquid crystal apparatus allowing a bright display and a reduced power consumption.

According to the present invention, there is provided an illumination device, comprising: a light-transmissive light guide member, and a light source disposed on a side of the light guide member to emit light to the light guide member; wherein the light guide member includes an anisotropic grating.

According to another aspect of the present invention, there is provided a liquid crystal apparatus, comprising: an illumination device emitting light, and a liquid crystal device illuminated by the light emitted from the illumination device;

wherein said illumination device is disposed along the liquid crystal device and includes a light-transmissive light guide member, and a light source disposed on a side of the light guide member to emit light to the light guide member; the light guide member including an anisotropic grating.

According to a further aspect of the present invention, there is provided a liquid crystal apparatus, comprising: an illumination device emitting light, and a liquid crystal device illuminated by the light from the illumination device to allow selective transmission of the light therethrough for data display, wherein said illumination device is disposed along the liquid crystal device and includes a light-transmissive light guide member, and a light source disposed on a side of the light guide member to emit light to the light guide member; the light guide member including an anisotropic grating and provided with a reflector disposed opposite to the liquid crystal device with respect to the light guide member disposed therebetween.

According to the present invention, when the illumination device is driven, light is emitted from the light source and enters the light guide member disposed in proximity to the light source, where the light is polarization-transformed or -converted by an anisotropic member and diffracted by the anisotropic lattice to be emitted as illumination light.

These and other objects, features and advantages of the present invention will become more apparent upon a consideration of the following description of the preferred embodiments of the present invention taken in conjunction with the accompanying drawings, wherein like parts are denoted by like reference numerals.

DESCRIPTION OF THE PREFERRED EMBODIMENTS

Preferred embodiments of the present invention will be described with reference to the drawings.

Figure 3:
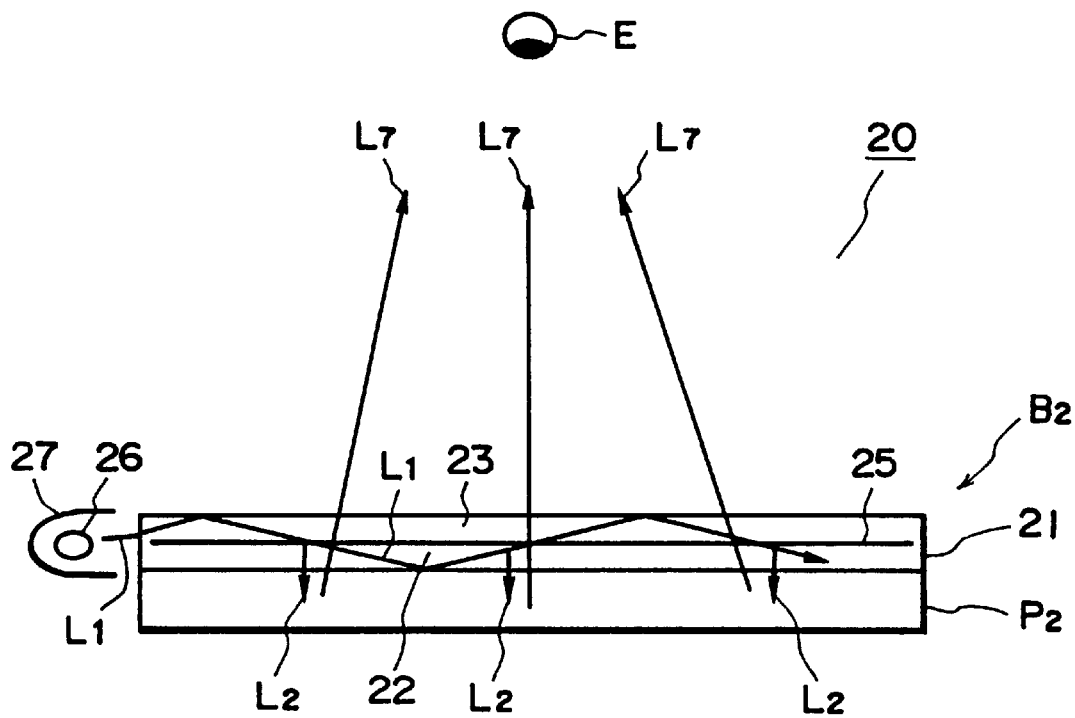
FIGS. 3 and 4–5 are a sectional view and detailed sectional views, respectively, for illustrating a structure and an operation of a reflection-type liquid crystal apparatus according to a first embodiment of the invention.

Referring to FIG. 3, an illumination device $B_3$ is disposed on a surface of a reflection-type liquid crystal panel $P_2$ in front of (on a viewer side of) the panel $P_2$ to constitute a liquid crystal apparatus 20.

The illumination device $B_3$ includes a light-transmission light guide member 21 and a light source 26 disposed on a lateral side of the light guide member 21. The light guide member 21 includes an anisotropic grating 25. The light guide member 21 further includes an anisotropic member 22 having a refractive index anisotropy and a non-anisotropic member 23 having substantially no refractive index anisotropy in a sense of including a refractive index anisotropy which is sufficiently smaller than that of the anisotropic member 22.

Figure 4:
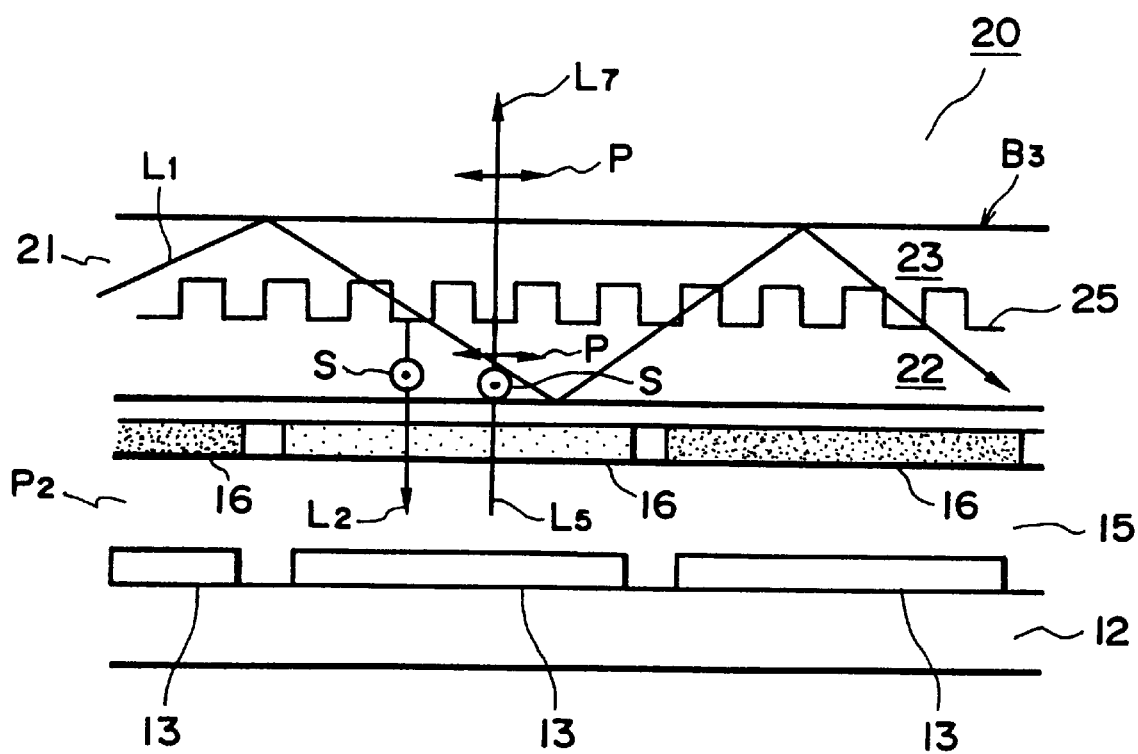
Figure 5:
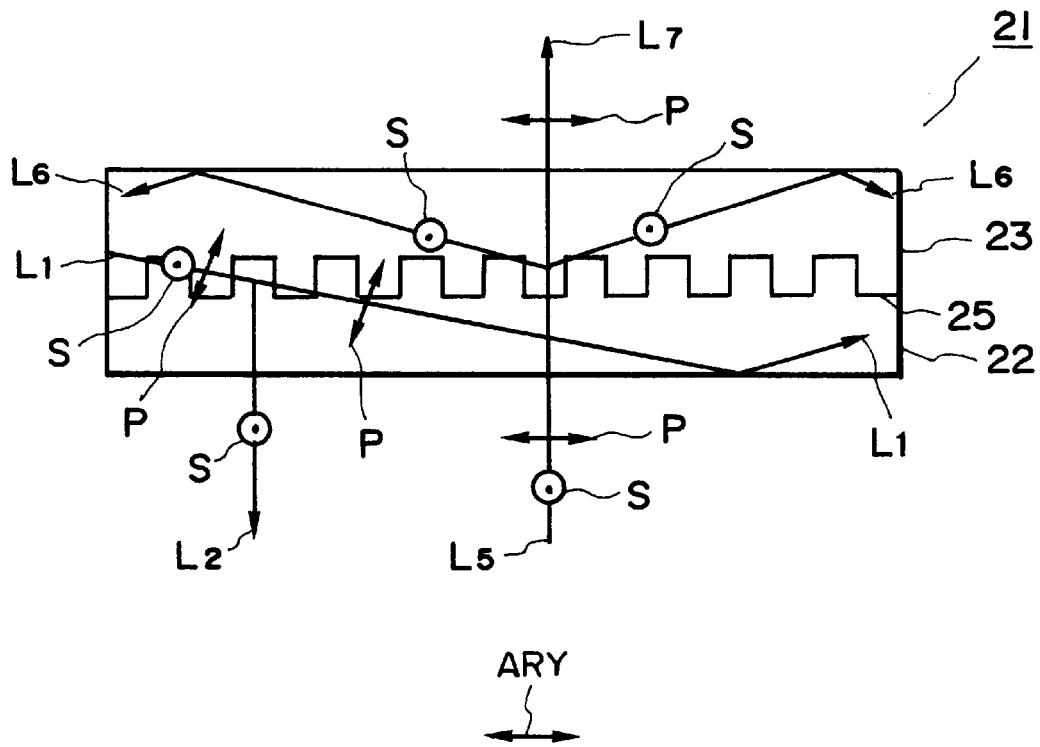
Figure 6:
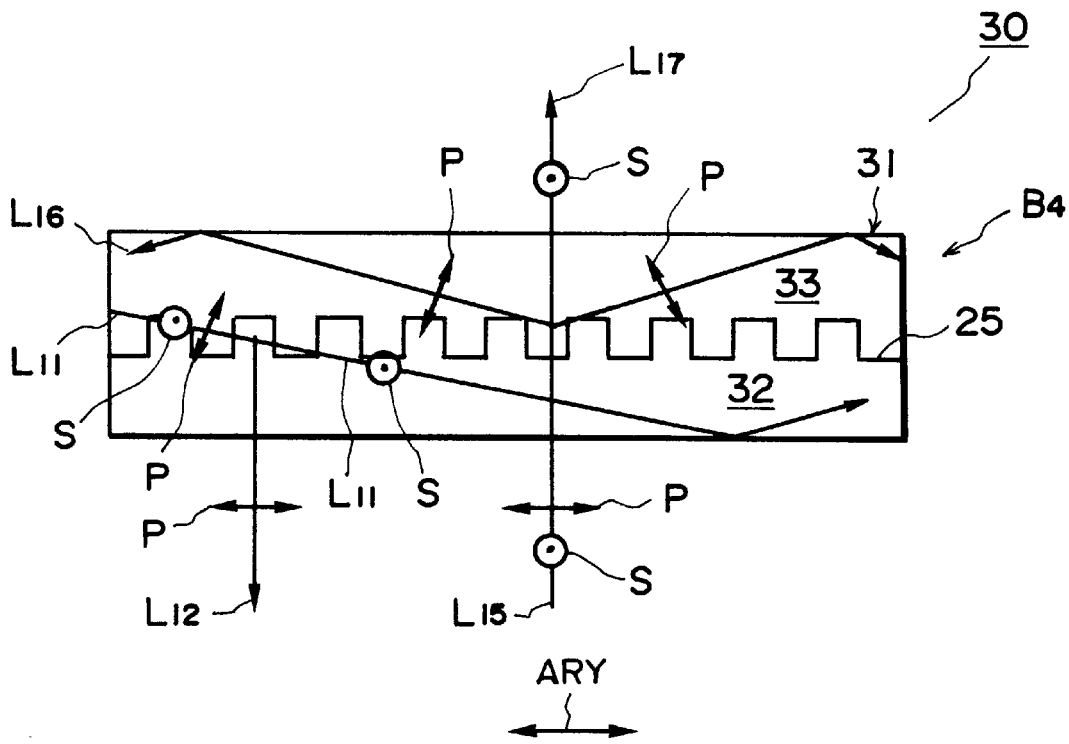
FIGS. 6 and 7 are sectional views for illustrating the structures, etc., of liquid crystal apparatus according to second and third embodiments, respectively, of the invention.

The anisotropic grating 25 is formed at the boundary between the anisotropic member 22 and the non-anisotropic member 23 in a relief pattern providing a series of rectangular protective sections as illustrated in more detail in FIGS. 4–6. Thus, the anisotropic grating is a one-dimensionally arranged grating and, in its one-dimensional grating arrangement direction, has a refractive index distribution which is periodical with respect to linearly polarized light having a polarization plane (based on an electric vector vibration direction) perpendicular or parallel to the arrangement direction but uniform with respect to linearly polarized light having a polarization plane perpendicular to the polarized light direction.

As shown in FIG. 3, light $L_1$ is emitted from the light source 26 to the light guide member 21, and the emitted light $L_1$ entering the light guide member 21 repetitively causes a total reflection at an angle exceeding a critical angle of total reflection ("total reflection angle") Qc to be propagated over the entire region of the light guide member 21.

While being transmitted through the anisotropic member 22, the light $L_1$ is polarization-transformed, and a portion thereof ($L_2$) is diffracted by the anisotropic grating 25 to be guided toward the liquid crystal device $P_2$. The light emitted to the liquid crystal device $P_2$ is reflected imagewise by the panel to be again transmitted through the light guide member 21 to reach eyes E of a viewer.

This embodiment allows a high-luminance bright display characteristic of a reflection-type liquid crystal apparatus and accordingly a reduced power consumption. Further, as the aperture rate can be increased, it is possible to provide a high-density two-dimensional pixel arrangement, thus realizing a multi-pixel display apparatus.

Figure 2:
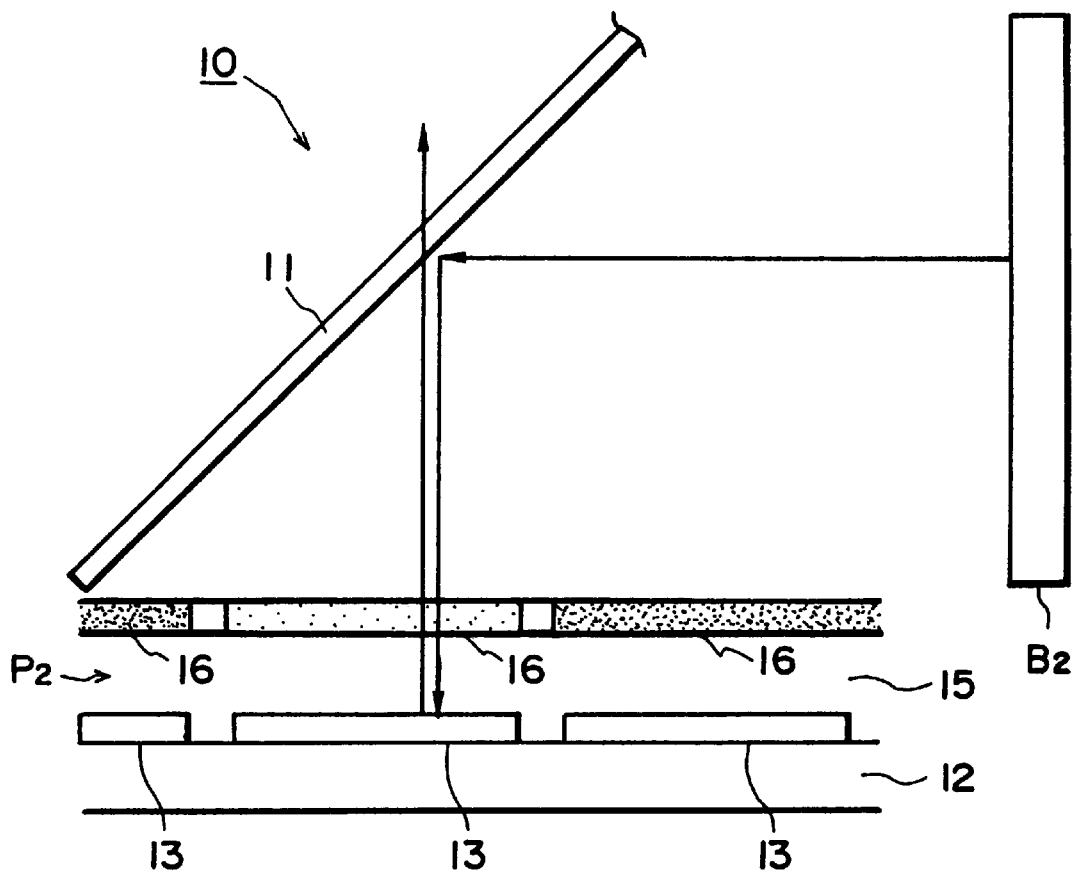
FIG. 2 is a sectional view for illustrating a conventional reflection-type liquid crystal apparatus.

Further, according to this embodiment, light $L_1$ from the light source is diffracted by the anisotropic grating 25 to be guided to the liquid crystal device $P_2$, so that a half mirror 11 (FIG. 2) as in a conventional apparatus is not required. Further, the light emitted from the light source 26 and having entered the light guide member 21 is propagated by total reflection over the entire region of the light guide member 21 and diffracted by the anisotropic grating 25 to provide light $L_2$ having a uniform luminance distribution. Accordingly, the illumination device $B_3$ can be reduced in size and thickness similarly as one used in a transmission-type liquid crystal apparatus, thereby providing a small-size, thin and light-weight reflection-type liquid crystal apparatus. Further, as the illumination device $B_3$ is small-sized, it evolves less heat, requires no measure for heat dissipation, such as a cooling fan and can provide a simpler and lighter apparatus by that much.

In this embodiment, light subjected to polarization transformation by the anisotropic member 22 is sequentially diffracted by the anisotropic grating to be used for illumination of the liquid crystal device $P_2$. As a result, according to this embodiment, it is possible to provide a high-luminance liquid crystal apparatus excellent in illumination efficiency.

The anisotropic member 22 used in the present invention may comprise a uniaxial or biaxial crystal or polymeric material, examples of which may include: lithium niobate ($LiNbO_3$), lithium tantalate ($LiTaO_3$), barium titanate ($BaTiO_3$), zinc oxide (ZnO), ammonium diphosphate (ADP, $NH_4H_2PO_4$), potassium diphosphate (KDP, $KH_2PO_4$), calcium carbonate ($CaCO_3$), quartz ($SiO_2$); a film of a polymer such as polycarbonate, a pair of films sandwiching a liquid crystal, and a polymeric liquid crystal film.

An anisotropic member composed of a crystal may have a good property or performance. On the other hand, an anisotropic member composed of a polymer film allows a production in a large area and is advantageous for its inexpensiveness. An anisotropic member including a liquid crystal may require an aligning treatment and an alignment film for aligning the liquid crystal but may provide excellent performances which can be optimally selected depending on the filled of application, display size, optical requirements, etc.

On the other hand, the non-anisotropic member 25 having no or very low refractive index anisotropy may for example comprise flint glass or zinc sulfate (ZnS).

The anisotropic grating 25 used in the present invention may be easily formed by etching, etc.

Diffraction of ordinary ray may be utilized, but diffraction of extraordinary ray can also be used. As a specific method, during the formation of a grating pattern on the anisotropic member, a region subjected to proton-exchange may be selectively coated with a dielectric layer (of, e.g., SiO, $SiO_2$, SiN, etc.) so as to effect a compensation for providing a phase difference $\Delta\phi=\pi$ for extraordinary ray for which an increased diffraction efficiency should be attained and a phase difference $\Delta\phi=0$ for ordinary ray for which the diffraction should be removed. In this case, the non-anisotropic member 23 may be designed to have a refractive index matched with that of the refractive index for the ordinary ray, so as to provide $\Delta n=0$. Also in this instance, the optical axis direction of the anisotropic member 22 may arbitrarily set in the X-axis direction or the Y-axis direction as desired so as to provide illumination light with desired polarization direction.

The grating should have a refractive index anisotropy but the direction of larger to smaller refractive index and the optical axis direction may be selected arbitrarily.

The above explanation has been based on the use of transmission-side ± first-order diffraction light as the diffraction light, but reflection-side diffraction light and higher-order diffraction light may also be utilized based on similar function. However, light diffracted toward the viewer side and entering a boundary with air at an angle below the total reflection angle θc can provide an inferior image quality due to flare or ghost. Further, 0th-order diffraction light may also be utilized by disposing a polarizer (polarized light-detection means) having a transmission axis in a direction of polarized light to be observed between the light guide member 21 and the viewer so as to interrupt unnecessary diffraction light.

The illumination device according to the present invention may be combined with not only a reflection-type liquid crystal device but also a transmission-type liquid crystal device. In the latter case, it is desired to dispose a reflector on a back side of the light guide member, i.e., a side opposite to the side facing the liquid crystal device of the light guide member. Further, it may also be preferred to insert a scattering layer for light scattering or a phase device for polarization-conversion or transformation of light between the reflector and the rear surface of the light guide member. By adopting such means, it becomes possible to provide a more uniform light quantity distribution and a higher luminance.

Further, in either case of combination with a reflection-type liquid crystal device or a transmission-type liquid crystal device, it is preferred to dispose a reflector on at least one lateral side of the light guide member not provided with a light source. It is further preferred to dispose a phase device between the reflector and the side of the light guide member provided with the reflector.

The reflector or reflecting member may comprise a thin or thick film of a metal, such as Al, Ag, Pt or Au, or a flexible sheet of a reflective characteristic.

The reflector may be disposed on a lateral side of the light guide member opposite to the lateral side thereof provided with the light source or on sides of the light guide member adjacent to the lateral side thereof provided with the light source. Particularly, in the case of disposing a light source along only one lateral side of a rectangular-plate shaped light guide member, it is preferred to dispose reflectors on the remaining three lateral sides of the light guide member.

The phase device need not necessarily be dispose between a side of the light guide member and a reflector but can also be disposed at a position remote from the reflector. The phase device may have a rectangular strip-shaped cross section or a wedge-shaped cross section. Further, the phase device can also be formed as a portion of a lateral side of the light guide member.

Further, a reflector may be disposed on a lateral side of the light guide member and a phase device is disposed on a path of light emitted from the light source, so that the emitted light is polarization-converted by the phase device. As a result, the emitted light passing through the light guide member is transformed under the functions of both the anisotropic member having a polarization conversion function and the phase device for converting the polarization state to be effectively utilized through the anisotropic grating as illumination light. As a result, the illumination light quantity is further increased to provide a further increased image brightness when applied to a liquid crystal apparatus.

In case where a reflector is disposed opposite to the light source with respect to the light guide member disposed therebetween so that light emitted from the light source and transmitted through the light guide member is reflected by the reflector, the number of light sources can be reduced to reduce the power consumption of the illumination device accordingly.

Further, when the phase device is designed to have a wedge-shaped cross section so that the boundary between the phase device and the light guide member is inclined with respect to the reflector, it is possible to positively provide different anisotropies for forward and backward propagation of polarized light, thereby providing a further improved polarization conversion efficiency.

The liquid crystal device used in the present invention may preferably be one utilizing polarized light modulation with a nematic or cholesteric liquid crystal or a smectic liquid crystal. The liquid crystal device using the former type of liquid crystal may representatively be a twisted nematic liquid crystal device of an active matrix-type or a simple matrix type. The liquid crystal device utilizing the latter type of liquid crystal may representatively be a ferroelectric or an anti-ferroelectric liquid crystal device.

A reflection-type liquid crystal device may be provided by forming one of a pair of electrodes sandwiching the liquid crystal as a reflective electrode of, e.g., Al, Ag or Pt. The surface of the reflective electrode may preferably be mirror-finished. Alternatively, the surface of the reflective electrode may be processed to have a light-scattering surface.

A transmission-type liquid crystal device may be provided by forming the pair of electrodes as light-transmissive electrodes. In the case of a liquid crystal device using a pair of electrodes formed on a substrate for applying an in-plane electric field to the liquid crystal, the electrodes need not be transparent.

The anisotropic grating may desirably have projections formed at a pitch which is smaller than the pixel arrangement pitch of a liquid crystal device used in combination therewith so as to effectively suppress the occurrence of moire.

The liquid crystal device used in the present invention may include a layer of color formed on an inner surface of a pair of substrates. In case where an anisotropic grating functioning as a diffraction grating is used, a problematic dispersion of light is liable to occur, but the problem can be solved by using a color filter as the reflected light from a liquid crystal pixel entering the anisotropic grating becomes monochromatic light.

Hereinbelow, some embodiments of the present invention will be described with reference to the drawings.

First Embodiment

The first embodiment of the present invention will be described with reference to FIGS. 3 to 5.

Referring to FIG. 3, a reflection-type liquid crystal apparatus 20 includes a reflection-type liquid crystal panel $P_2$, in front of which an illumination device $B_3$ is disposed on a viewer E side.

The illumination device $B_3$ includes a light guide member 21 disposed along the liquid crystal panel $P_2$, and the light guide member 21 includes an anisotropic substrate 22 and a non-anisotropic layer 23 in lamination. The anisotropic substrate 22 (e.g., in a thickness of 0.1–1 mm) comprises a dielectric material showing birefringence and composed of uniaxial crystal $LiNbO_3$ exhibiting a uniaxial refractive index ellipsoid. $LiNbO_3$ is characterized by a large difference in refractive indices for extraordinary ray and ordinary ray (e.g., $n_e$=2.30 and $n_o$=2.20, respectively at a wavelength $\lambda$=0.55 $\mu$m).

Between the anisotropic substrate 22 and the non-anisotropic layer 23, unevennesses 25 are formed as shown in detail in FIG. 4. The unevennesses 25 are formed in parallel with an optical axis and functions as a one-dimensional anisotropic grating of a relief pattern. (Hereinafter, the unevennesses 25 are referred to as an anisotropic grating 25.) In this embodiment, the anisotropic grating 25 is designed to diffract the ordinary ray (that will be described in more detail later). In this embodiment, the grating pattern of the anisotropic grating 25 has been formed through a proton exchange process wherein specific regions of a glass substrate (precursor plate of the anisotropic substrate 22) are subjected to selective proton exchange (e.g., exchange of $Li^+$ with $H^+$) and are selectively etched with hydrofluoric acid to form grating-form grooves.

In this embodiment, a relief-patterned anisotropic grating 25 having grooves with a depth $t$ is formed so that the phase difference $\Delta\phi$ thereof is given by the following formulae.

$$\Delta\phi = \begin{cases} \Delta n_o \cdot t & \text{(for ordinary ray),} \\ \Delta n_e \cdot t & \text{(for extraordinary ray),} \end{cases}$$

wherein $\Delta n_o$ and $\Delta n_e$ are refractive index differences between the anisotropic substrate 22 and the non-anisotropic layer 23 for ordinary ray and extraordinary ray, respectively.

In this embodiment, the phase difference $\Delta\phi$ is designed to be n for ordinary ray for which an increased diffraction efficiency is desired to be provided, and O for extraordinary ray for which no diffraction is desired, by setting the groove depth t. In this embodiment, the pitch d (e.g., 1.1 $\mu$m) of the anisotropic grating may be designed to be on the order of $\Delta$=0.55 $\mu$m or larger corresponding the incident angle of a light flux forming a largest peak in light quantity distribution of the incident light. More specifically, as the central wavelength ($\lambda$) of the incident light is 0.55 $\mu$m, incident light entering the grating 25 at a maximum angle (90 deg.) to the grating, i.e., light entering along the anisotropic rating 24, is also diffracted by the anisotropic grating 25, so that the liquid crystal panel $P_2$ may be effectively be diffracted. The pitch d is set to be smaller than the pitch (e.g., 20–300 $\mu$m) of the pixel arrangement structure in the anisotropic grating arrangement direction (i.e., the pixel pitch in the grating arrangement directions), so that the occurrence of moire can be obviated.

On the other hand, the groove depth $t$ may be set to a value (e.g., 2.75 $\mu$m) suitable for compensating for a refractive index increase for extraordinary ray and a refractive index decrease for ordinary ray due to the proton exchange.

Further, in this embodiment, the refractive index (e.g., n=2.20) of the non-anisotropic layer 23 is matched with (i.e., set to be substantially equal to) the refractive index $n_e$ of the anisotropic substrate 22, e.g., by composing the non-anisotropic layer 23 of flint glass having a controlled lead (P6) content.

Referring further to FIG. 3, on a lateral side of the light guide member, a cathode ray tube 26 is disposed as a light source, and a reflector shade 27 is disposed so as to cover the cathode ray tube 28. From the cathode ray tube 26, spontaneous emission light is emitted to the light guide member 21.

The function and the effect of this embodiment are as follows.

When the liquid crystal apparatus is driven, the respective pixel electrodes 13 are supplied with appropriate voltages to drive the respective pixels to states suitable for displaying prescribed image data.

On the other hand, light $L_1$ is emitted from the cathode ray tube 26 as shown in FIG. 3, and the light $L_1$ enters, after reflection and condensation by the reflector shade 27 or directly, the light guide member 21 through its edge surface. The entering light $L_1$ repetitively causes total reflection at angles equal to or larger than the total reflection angle θc to be propagated over the entire region of the light guide member 21. The light $L_1$ emitted from the cathode ray tube 26 and reflected by the reflector shade 27 is inherently a spontaneous emission light so that it is basically random polarized light and may be regarded as elliptically polarized light.

The light $L_1$ is not subjected to birefringence when transmitted through the non-anisotropic layer 23 but subjected to birefringence when transmitted through the anisotropic substrate 22. In this embodiment, as the anisotropic grating 25 (more specifically projections or unevenness 25 thereof) is arranged in a direction parallel to the optical axis, the ordinary ray is s-polarized light having an electric sector vibrating direction perpendicular to the drawing, and the extraordinary ray is p-polarized light having an electric vector-vibrating direction parallel to (or included in) the drawing.

While repeating the total reflection, the light $L_1$ enters the anisotropic grating 25 at an angle of $\theta c$ or larger, where only the s-polarized light $L_2$ (ordinary ray) is diffracted toward the liquid crystal panel $P_2$ and the p-polarized light $L_1$ passes through the anisotropic grating 25 since the refractive index of the non-anisotropic layer is matched with (i.e., set to be substantially equal to) the refractive index of the anisotropic substrate 22 for extraordinary ray in this embodiment. The p-polarized light transmitted through the anisotropic grating 25 is again subjected to birefringence to form elliptically polarized light, of which s-polarized light $L_2$ is again diffracted by the anisotropic grating 25 to be separated.

On the other hand, the s-polarized light $L_2$ diffraction-separated by the anisotropic grating 25 is caused to pass through a color filter 16 of R, G or B perpendicularly as light composed of only linear polarized light component (FIG. 4), where a specific wavelength range is selected. Then, the polarized light component $L_2$ of the selected wavelength range is reflected by a pixel electrode 13 and modulated when transmitted twice through the liquid crystal layer 15 depending on the data (or liquid crystal state based thereon) of each pixel. The thus-reflected light $L_5$ basically includes both p- and s-polarized light components depending on the gradation state of the pixel, and the intensity of the p-polarized light component thereof corresponds to the color signal and luminance signal of the pixel in this embodiment. The light $L_5$ (elliptically polarized light containing both p- and s-components) enters the anisotropic grating 25, where light $L_6$ (s-polarized light) therein having a direction identical to the incident polarized light is diffracted by the anisotropic grating 25 to cause repetitive total reflection within the light guide member 21. In contrast thereto, p-polarized light component $L_7$ perpendicular to the incident polarized light is transmitted through the anisotropic grating 25 to reach eyes E of the viewer and be recognized as an image carrying an intensity distribution of the polarized light component. Thus, in this embodiment, the light guide member 21 functions also as a polarizer. In the light guide member 21, the s-polarized light $L_6$ is totally reflected to proceed within the light guide member 21 and again diffracted by the anisotropic grating 25 to be guided to the liquid crystal panel $P_2$.

According to this embodiment, it becomes possible to effect a high-luminance bright display characteristic of a reflection-type liquid crystal apparatus and accordingly reduce the powder consumption. Further, as the aperture rate can be increased, the pixels can be arranged at a high density to provide a display apparatus with an increased number of pixels.

This embodiment does not necessitate conventional means, such as a half mirror, so that the illumination device $B_3$ can be reduced in size and thickness similarly as one used in a transmission-type liquid crystal apparatus, thus providing a small-sized and light-weight reflection-type liquid crystal apparatus. Further, as the illumination device $B_3$ is small-sized, the heat evolution is reduced to make heat-dissipation means, such as a cooling fan unnecessary, and the entire liquid crystal apparatus can be simplified and reduced in weight accordingly.

In this embodiment, only s-polarized light $L_2$ within light $L_1$ emitted from the cold cathode ray tube 26 is diffracted by the anisotropic grating 25 to be used for illuminating the liquid crystal panel $P_2$, and p-polarized light $L_1$ is transmitted through the anisotropic grating 25. However, while repetitively causing total reflection after transmission through the anisotropic grating 25, the p-polarized light $L_1$ is subjected to birefringence by the anisotropic substrate 22 to be transformed into elliptically polarized light, of which the resultant s-polarized light $L_2$ is diffracted by the anisotropic grating 25 to be used for illumination of the liquid crystal panel $P_2$. Thus, the light $L_1$ emitted from the cold cathode ray tube 26 is consequently entirely converted into s-polarized light to be used for illumination of the liquid crystal panel $P_2$. Accordingly, it is possible to obtain a high-luminance liquid crystal apparatus excellent in illumination efficiency according to this embodiment.

Similarly, only p-polarized light $L_7$ is allowed to pass through the anisotropic grating 25 after the reflection by the pixel electrode 13 to reach the viewer E, and the s-polarized light $L_6$ in the light $L_5$ reflected from the liquid crystal panel $P_2$ does not reach the viewer E. However, during the repetitive total reflection within the light guide member 21, the s-polarized light is again diffracted toward the liquid crystal panel $P_2$ to be reutilized as illumination light, thus further increasing the illumination efficiency.

The use of a diffraction grating as in this embodiment is generally liable to cause a problem of light diffusion (color diffusion). However, in this embodiment, as the color filter 16 is used, light $L_5$ entering the diffraction grating (anisotropic grating) is monochromatic light, thus obviating the problem of color diffusion accompanying the diffraction.

In this embodiment, the light guide member 21 is constituted by an anisotropic substrate 22 and a non-anisotropic layer 23 having substantially no refractive index anisotropy, which are laminated with each other to form a relief-patterned anisotropic grating 25 at the boundary therebetween, so that the totally reflected light $L_1$ can be smoothly guided, and the formed anisotropic grating 25 can be protected by the non-anisotropic layer 23.

Second Embodiment

Second embodiment will now be described with reference to FIG. 6, wherein like parts as in FIG. 5 are denoted by like reference numerals, and description thereof and functions and effects similar to those in First embodiment may be omitted.

Referring to FIG. 6, a liquid crystal apparatus 30 according to this embodiment includes a reflection-type liquid crystal panel $P_2$ (not shown) similar to the one used in the First embodiment, and an illumination device $B_4$ is disposed in front of the liquid crystal panel $P_2$. The illumination device $B_4$ includes a light guide member 31 (similar to the member 21 in First embodiment), on a side of which a cold cathode ray tube, etc., (not shown) is disposed.

The light guide member 31 is composed as a laminate of an anisotropic substrate 32 and a non-anisotropic substrate 33 forming a boundary therebetween at which an anisotropic grating 35 is formed. In this embodiment, as shown in FIG. 6, the anisotropic grating 35 is arranged in a direction (ARY) which is perpendicular to the optical axis of the substrate 32 in contrast with the arrangement direction (ARY) of the anisotropic grating 25 which has been taken parallel to the optical axis of the substrate 22 in the First embodiment (as shown in FIG. 5). As a result, s-polarized light having an electric vector vibration direction perpendicular to the drawing is extraordinary ray and p-polarized light having an electric vector vibrating direction parallel to the drawing is ordinary ray. Further, in this embodiment, diffraction of ordinary ray (p-polarized light) is utilized, and the refractive index of the non-anisotropic layer 33 is matched with that of the anisotropic substrate 32 for extraordinary ray.

The function and effects of this embodiment will now be described.

When the liquid crystal apparatus 30 is driven, the liquid crystal panel $P_2$ is driven into a state suitable for displaying a prescribed image, and light $L_{11}$ emitted from the cold cathode ray tube 26 enters the light guide member 31 to cause repetitive total reflection within the light guide member 31.

During the repetition of total reflection, light $L_{11}$ is incident to the anisotropic grating 35 at an angle of θc or more. At that time, only p-polarized light (ordinary ray) is diffracted by the anisotropic grating 35 toward the liquid crystal panel $P_2$ and s-polarized light $L_{11}$ is transmitted through the grating 35. The s-polarized light $L_{11}$ having passed through the anisotropic grating 35 is again subjected to birefringence by the anisotropic substrate 32 to be elliptically polarized light, of which p-polarized light component $L_{12}$ is diffraction-separated by the anisotropic grating 35.

On the other hand, the p-polarized $L_{12}$ diffraction-separated by the anisotropic grating 35 is caused to pass through a color filter 16 of R, G or B perpendicularly as light composed of only linear polarized light component, where a specific wavelength range is selected. Then, the polarized light component $L_{12}$ of the selected wavelength range of reflected by a pixel electrode 13 and modulated when transmitted twice through the liquid crystal layer 15 depending on the data of each pixel. The thus reflected light $L_{15}$ basically includes both p- and s-polarized light components depending on the gradation state of the pixel, and the intensity of the s-polarized light component thereof corresponds to the color signal and luminance signal of the pixel in this embodiment. The light $L_{15}$ (elliptically polarized light containing both p- and s-components) enters the anisotropic grating 35, where light $L_{16}$ (p-polarized light) therein having a direction identical to the incident polarized light is diffracted by the anisotropic grating 35 to cause repetitive total reflection within the light guide member 31. In contrast thereto, s-polarized light component $L_{17}$ perpendicular to the incident polarized light is transmitted through the anisotropic grating 35 to reach eyes E of the viewer and be recognized as an image carrying an intensity distribution of the polarized light component. Thus, in this embodiment, the light guide member 31 functions also as a polarizer. In the light guide member 31, the p-polarized light $L_{16}$ is totally reflected to proceed within the light guide member 31 and again diffracted by the anisotropic grating 35 to be guided to the liquid crystal panel $P_2$.

When diffraction by a grating is considered in general, it is easier to have a high diffraction efficiency for s-polarized light, and it is unnecessary to use diffraction of p-polarized light as in this embodiment. However, in case of incorporating a reflection-type liquid crystal apparatus in apparatus, such as an electronic view finder and a head-mounted display, if only diffraction of s-polarized light can be used, it may be necessary to use a lens or mirror system for guiding linearly polarized light toward a viewer in some cases, thus making the entire apparatus complicated and expensive. In such a case, if diffraction of p-polarized light is used as in this embodiment, such a lens or mirror system can be unnecessitated to make the entire apparatus simplified and inexpensive.

In this embodiment, only p-polarized light $L_{12}$ within light $L_{11}$ emitted from the cold cathode ray tube 26 is diffracted by the anisotropic grating 35 to be used for illuminating the liquid crystal panel $P_2$, and s-polarized light $L_{11}$ is transmitted through the anisotropic grating 35. However, while repetitively causing total reflection after transmission through the anisotropic grating 35, the s-polarized light $L_{11}$ is subjected to birefringence by the anisotropic substrate 32 to be transformed into elliptically polarized light, of which the resultant p-polarized light $L_{12}$ is diffracted by the anisotropic grating 35 to be used for illumination of the liquid crystal panel P2. Thus, the light $L_{11}$ emitted from the cold cathode ray tube 26 is consequently entirely converted into p-polarized light to be used for illumination of the liquid crystal panel $P_2$. Accordingly, it is possible to obtain a high-luminance liquid crystal apparatus excellent in illumination efficiency according to this embodiment.

Similarly, only s-polarized light $L_{17}$ is allowed to pass through the anisotropic grating 35 after the reflection by the pixel electrode 13 to reach the viewer E, and the p-polarized light $L_{16}$ in the light $L_{15}$ reflected from the liquid crystal panel $P_2$ does not reach the viewer E. However, during the repetitive total reflection within the light guide member 31, the p-polarized light $L_{16}$ is again diffracted toward the liquid crystal panel $P_2$ to be re-utilized as illumination light, thus further increasing the illumination efficiency.

Third Embodiment

Third embodiment will be described with reference to FIGS. 7 and 8.

Figure 7:
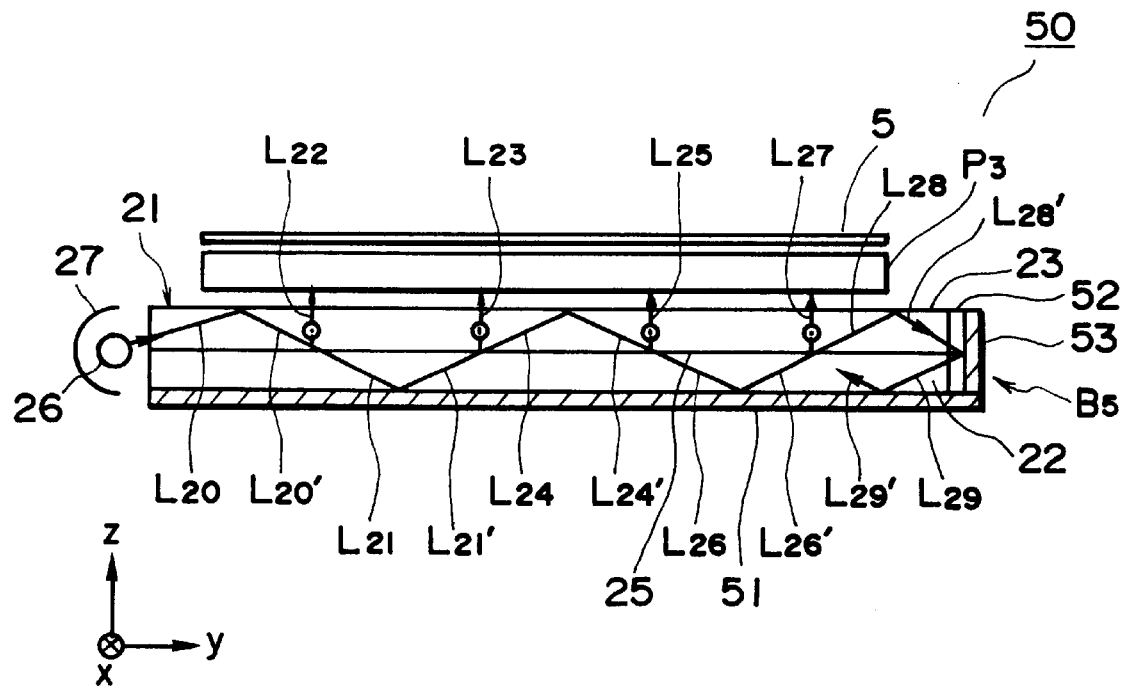

FIG. 7 is a schematic sectional view for illustrating an organization of a transmission-type liquid crystal apparatus 50. The liquid crystal apparatus 50 includes a transmission-type liquid crystal panel $P_3$, behind which (i.e., on an opposite side of a viewer) an illumination device $B_5$ is disposed along the liquid crystal panel $P_3$.

Similarly as in the previous embodiments, the illumination device $B_5$ includes an anisotropic substrate (anisotropic member) 22 and a non-anisotropic layer (non-anisotropic member) 23. The anisotropic substrate is composed of $LiNbO_3$ also in this embodiment, and the optical axis of the crystal is taken in a Y-axis direction (FIGS. 7 and 8).

Figure 1:
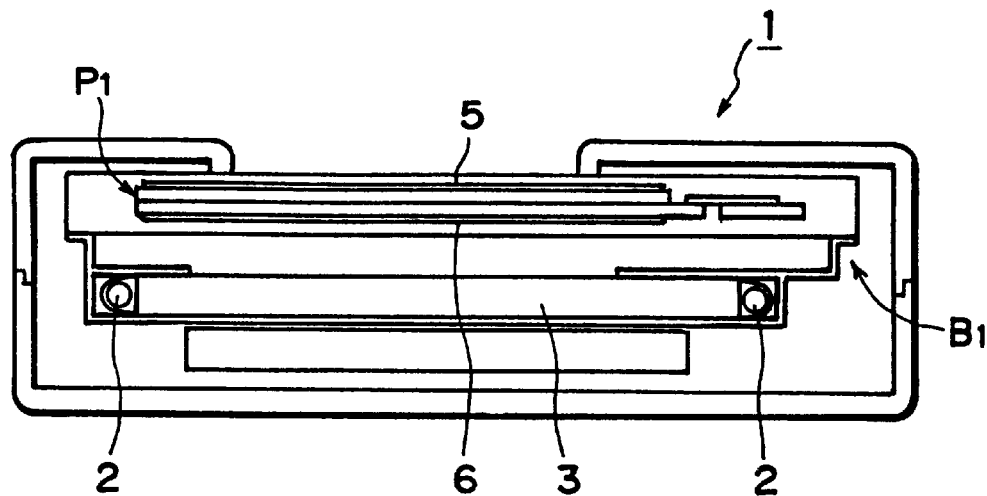
FIG. 1 is a sectional view for illustrating a conventional transmission-type liquid crystal apparatus.

The lower surface of the light guide member 21 (i.e., of the anisotropic substrate 22) is coated with a vapor-deposited reflecting film to form a reflector (second reflector) 51. On a side of the light guide member 21 (not provided with a cold cathode ray tube 26), a phase plate (a first phase element) 52 and a reflector (first reflector) 53 are disposed so as to be opposite to the cold cathode ray tube 26 with the light guide member 21 disposed therebetween. In the transmission-type liquid crystal apparatus 50, a polarizer 6 as used in a conventional liquid crystal apparatus shown in FIG. 1 has been omitted, and only a polarizer sheet 5 is disposed on a viewer side of the liquid crystal panel $P_3$. The phase plate 52 provides a phase difference to light having passed therethrough and converts the light into elliptically polarized light. The phase plate 52 is disposed along the reflector (reflecting surface) 53 and is designed to have a uniform thickness (length in the y-direction).

In this embodiment, a relief-patterned anisotropic grating 25 having grooves with a depth t is formed so that the phase difference Δθ thereof is given by the following formulae.

$$\Delta\phi = \begin{cases} \Delta n_o \cdot t & \text{(for ordinary ray)}, \\ \Delta n_e \cdot t & \text{(for extraordinary ray)}, \end{cases}$$

wherein $\Delta n_o$ and $\Delta n_e$ are refractive index differences between the anisotropic substrate 22 and the non-anisotropic layer 23 for ordinary ray and extraordinary ray, respectively.

In this embodiment, in order to cause diffraction of ordinary ray and suppress diffraction of extraordinary ray, the refractive index of the non-anisotropic layer 23 is matched with the refractive index for extraordinary ray of the anisotropic substrate 22. Accordingly, $\Delta n_e=0$ ($\Delta\theta=0$ for extraordinary ray so as not to cause diffraction). On the other hand, the groove depth $t$ is set to provide a phase difference $\Delta\theta$ of $\pi$ for ordinary ray so as to provide an increased diffraction.

The functions and the effects of this embodiment will be described.

Figure 8:
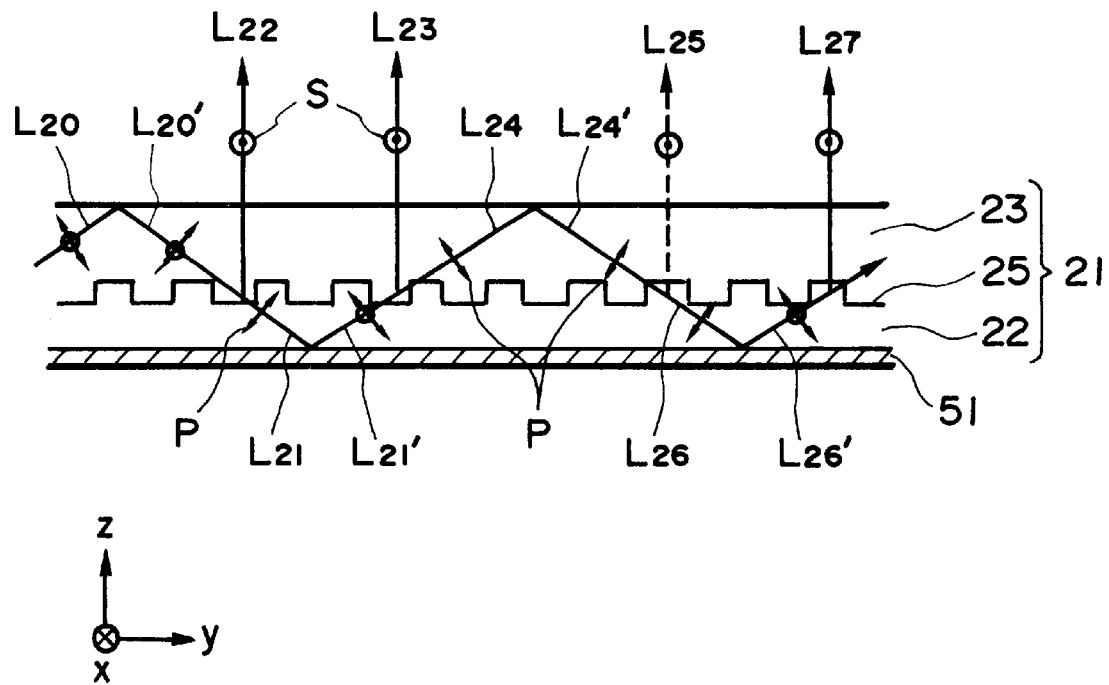
FIG. 8 is a sectional view for illustrating light behavior in the liquid crystal apparatus according to the third embodiment.

As shown in FIG. 8, light $L_{20}$ is emitted from the cold cathode ray tube 26 and enters the light guide member 21.

The incident light $L_{20}$ is propagated over the entire region of the light guide member 21 while causing total reflection within the light guide member 21. Incidentally, the light $L_{20}$ from the cold cathode ray tube 26 and the reflector shade 27 is inherently a spontaneous emission light, so that it is basically random polarized light, and the light flux thereof passing within the light guide member 21 may be regarded as elliptically polarized light containing both p- and s-polarization components in view of birefringence caused when it passes through the anisotropic substrate 22.

Now, the behavior of light within the light guide member is described.

Referring to FIG. 8, light $L_{20}$ incident to an upper boundary (with environmental air) of the non-anisotropic layer 23 at an angle equal to or larger than a total reflection angle $\theta c$ is totally reflected at the boundary (into $L_{20}'$) to be incident to the anisotropic grating 25 at an incidence angle $\beta$ of $\theta c$ or larger. As the light $L_{20}'$ is elliptically polarized light, the s-polarization component thereof is selectively diffracted to form $L_{22}$, which illuminates the liquid crystal device $P_3$.

On the other hand, the p-polarization component is not affected by the phase difference of the anisotropic grating 25 and is transmitted as it is through the anisotropic grating (into $L_{21}$). Then, the light $L_{21}$ is subjected to birefringence within the anisotropic substrate 22 into elliptically polarized light, which is reflected at the reflector surface 51 to form light $L_{21}'$. The light $L_{21}'$ enters the anisotropic grating 25 from its lower side, where the s-polarization component thereof is selectively diffracted into light $L_{23}$, which illuminates the liquid crystal device $P_3$.

The remaining p-polarization component ($L_{24}$) passes through the anisotropic grating 25 as it is to be totally reflected at the upper boundary of the non-anisotropic layer 23 into $L_{24}'$. While passing through the non-anisotropic layer 23, the p-polarization component is not transformed into elliptically polarized light (thus not generating s-polarization), so that it is transmitted through the anisotropic grating 25 as it is. However, in case where the s-polarization component in the light $L_{21}'$ is not fully diffracted when it has passed through the anisotropic grating 25 to remain in the light $L_{24}$, the s-polarization component is diffracted to form $L_{25}$. These phenomena are repeated thereafter.

A p-polarization component $L_{28}$ (FIG. 7) having passed through the anisotropic grating 25 is totally reflected at the upper boundary of the non-anisotropic layer 23 in a similar manner as described above to form $L_{28}'$, which is transmitted through the phase plate 52 and reflected by the reflector 53 into $L_{29}$. The light $L_{28}$ before entering the phase plate 52 is almost composed of p-polarization component but is trasformed into elliptically polarized light while it passes twice through the phase plate, and the light $L_{29}$ reflected by the reflector 53 is further provided with a phase difference by the anisotropic substrate 22. Thus, the light $L_{21}$ has been subjected to effective conversion into s-polarization component, which is diffracted by the anisotropic grating 25 to provide an increased light quantity for illuminating the liquid crystal panel $P_3$.

The phase difference given by the phase plate generally varies depending on the incident angle of light $L_{28}^{1'}$ entering the phase plate 52. However, as light entering the phase plate 52 is almost composed of p-polarization component in this embodiment, the incidence angle is at most $(\pi/2)-\theta c$ in view of the light guide characteristic of the light guide member 21. Further, in case where a uniaxial phase element is used as the phase plate 52, an angle of nearly 90 deg. is formed between a slow phase axis and a fast phase axis in the plane (X-Z plane) of the phase plate 52. Accordingly, it is desired to set the azimuth so that the p-polarized light forms an angle of 45 deg. each with respect to the two optical axes of the phase plate 52 and set the thickness so as to provide a phase difference of ca. $\lambda/2$ by reciprocation of oblique incident light. In case of $\lambda=550$ nm, a phase difference of ca. 250 nm will provide a maximum illumination light take-out rate in view of the incidence angle distribution and the phase difference given within the anisotropic substrate 22.

FIG. 7 shows only the light flux $L_{28}'$ entering the phase plate 52 from the non-anisotropic layer 23 but there is also naturally present a light flux entering the phase plate 52 from the anisotropic substrate 22. Such a light flux is similarly polarization-converted by the phase plate.

FIG. 7 shows only first-order diffraction light in a positive direction along Z-axis but, in an actual illumination device, there also occur diffraction light in a negative Z-axis direction and higher-order diffraction light. In this embodiment, these diffraction lights are consequently converted into s-polarized light to be emitted in the positive Z-axis direction for illuminating the liquid crystal panel $P_3$.

The above description has been made with respect to light flux subjected to total reflection at the upper boundary of the light guide member 21, so that the function of the reflector 51 in this embodiment may not have been fully made clear. The reflector 51 exhibits remarkable effects for light fluxes reflected at angles below Oc, such as light flux entering the light guide member 21 from the cold cathode ray tube 26 at a deep incidence angle, higher-order diffraction light at the anisotropic grating 25, and diffraction light toward the reflector 51. The polarization, reflection and transmission characteristics of light flux incident to the upper boundary of the light guide member 21 at incidence angles below the total reflection angle $\theta c$ depend on the incidence angles. The reflected light component enters the anisotropic grating 25. Within the diffraction light therefrom, a portion of s-polarized light is directly emitted as illumination light. A portion of the remaining s-polarized light within the non-anisotropic layer 23 is again partly reflected at the upper boundary of the light guide member 21, and similar phenomena are repeated to provide illumination light. A portion of diffracted s-polarized light and transmitted p-substrate 22 are subjected to birefringence and all reflected at the reflector 51 to re-enter the anisotropic grating 25 from the reverse side. Within the diffraction light therefrom, a portion of s-polarized light in the transmission-side diffraction light is directly emitted as illumination light, and the remaining s- and p-polarized light are repeatedly subjected to similar phenomena to be re-utilized.

In this embodiment, p-polarized light is converted into s-polarized light to be used as illumination light, thus allowing a high-luminance bright display.

Further, according to this embodiment, light flux of randomly polarized light from a cold cathode ray tube having an area and a large radiation angle is converted into linearly polarize planar illumination light having a uniform liquid quantity distribution, thus providing a high-efficiency, thin and light-weight illumination device.

In this embodiment, illumination light for illuminating the liquid crystal panel $P_3$ is almost composed of s-polarized light, so that no polarizer is required between the liquid crystal panel $P_3$ and the illumination device $B_5$. Accordingly, the light quantity loss due to the polarizer is reduced, and a high luminance good image can be provided accordingly.

Further, if the above-mentioned illumination device $B_5$ is used in combination with a color liquid crystal panel, a pixel color is selected at a prescribed wavelength by the color filter, so that the problem of optical dispersion (color dispersion) due to a diffraction grating can be obviated.

Figure 9:
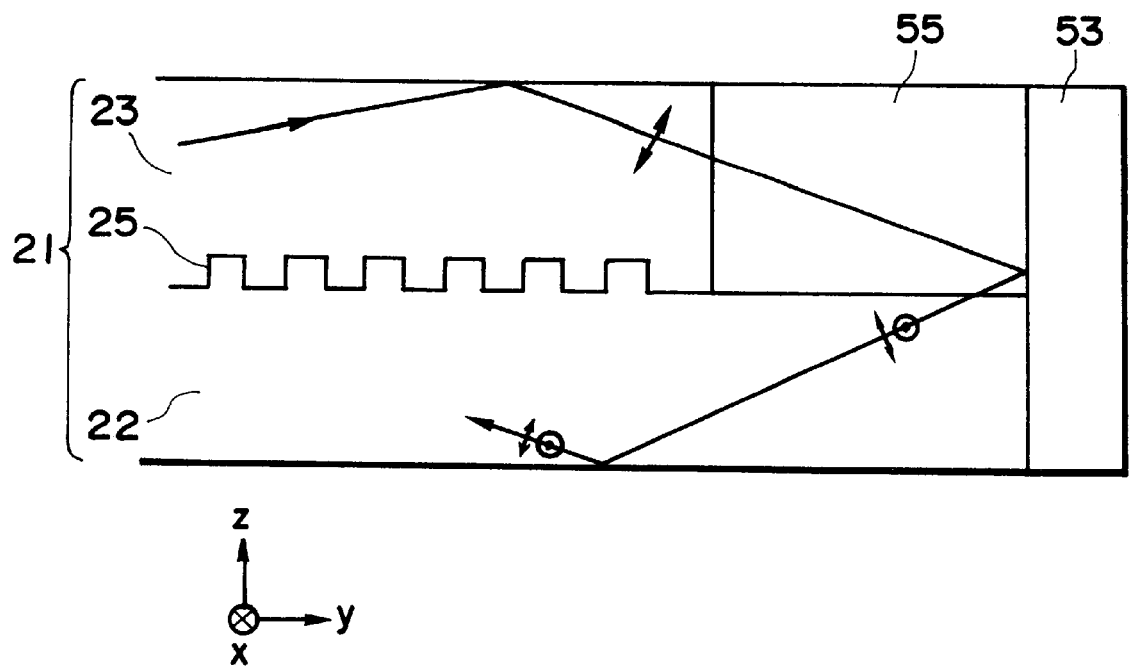
FIG. 9 is a sectional view for illustrating a modified phase plate.

In the above embodiment, the size in the Z-direction of the phase plate 52 is made equal to the thickness (in the Z-direction) of the light guide member 21. In other words, the phase plate 52 is disposed to be adjacent to the sides of both the anisotropic substrate 22 and the non-anisotropic layer 23. In contrast thereto, it is possible to dispose such a phase plate so as to cover only a portion of a side of the light guide member 21 as shown in FIG. 9, wherein a phase plate (first phase element) 55 is disposed only for the thickness of the non-anisotropic layer 23.

Fourth Embodiment

Fourth embodiment directed to a transmission-type liquid crystal apparatus will be described with reference to FIG. 10.

Figure 10:
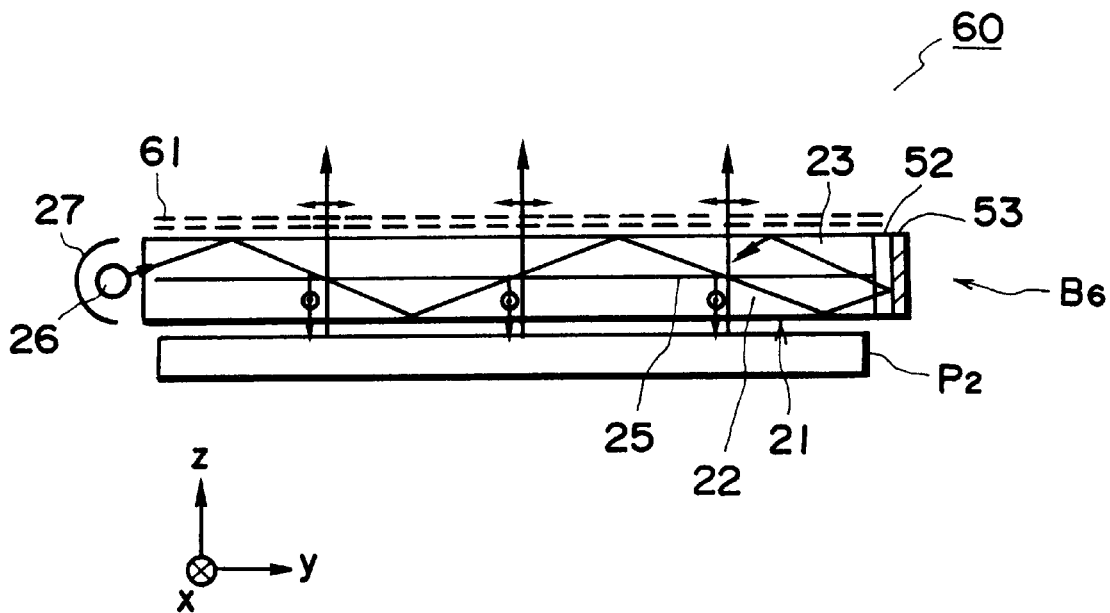
FIGS. 10, 12 and 15 are sectional views for illustrating structures of liquid crystal apparatus according to fourth, sixth and eighth embodiments, respectively, of the invention.

Referring to FIG. 10, a reflection-type 25 liquid crystal apparatus 60 includes a reflection-type liquid crystal panel $P_2$, in front of which an illumination device $B_6$ is disposed on a viewer side of and along the liquid crystal panel $P_2$.

The illumination device $B_6$ has a structure similar to that of the illumination device $B_5$ in the previous embodiment, but no reflector is disposed on either surface of the light guide member as it is used in combination with a reflection-type liquid crystal panel.

In the previous embodiment shown in FIG. 7, a polarizer 5 is disposed above a liquid crystal panel $P_3$. By contrast, in this embodiment, a polarizer 61 is disposed above the illumination device $B_6$ so as to provide an increased contrast of display image.

In this embodiment, s-polarized light emitted from the light guide member 21 in a Z-axis negative direction is used as illumination light. The s-polarized light is subjected to polarization modulation by respective pixels of the reflection-type liquid crystal panel $P_2$ to again enter the light guide member 21, whereby an image is reproduced as an intensity distribution of p-polarized light perpendicular to the s-polarized light used as the illumination light.

Within the polarized light reflected by the reflection-type liquid crystal panel $P_2$, s-polarization component is again diffracted by the anisotropic grating 25 and is propagated within the light guide member 21 while repetitively causing total reflection, so that the light guide member 21 functions also as a polarizer (analyzer). Light reaching the eyes of a viewer is composed of p-polarized light alone, by which an image is recognized.

In this embodiment, the light guide member 21 functions not only as a polarizer for illumination but also as an analyzer for image observation, so that s-polarized light reflected from the reflection-type liquid crystal panel $P_2$ can be converted into p-polarized light for illumination, so that the image luminance can be increased.

s-Polarized light possibly leaked toward a viewer side is non-modulated linear polarized light but cannot be discriminated from p-polarized light with human eyes lacking the discrimination ability, thus possibly deteriorating the image quality. Further, it can cause flare or ghost to deteriorate the image quality. These problems can be solved by disposing a polarizer sheet 61 having a transmission axis aligned with p-polarized light for observation between the light guide member 21 and the viewer. The disposition of the polarizer 61 decreases the light quantity to some extent, but a sufficiently improved luminance can be attained compared with that in a conventional liquid crystal apparatus.

Fifth Embodiment

Figure 11:
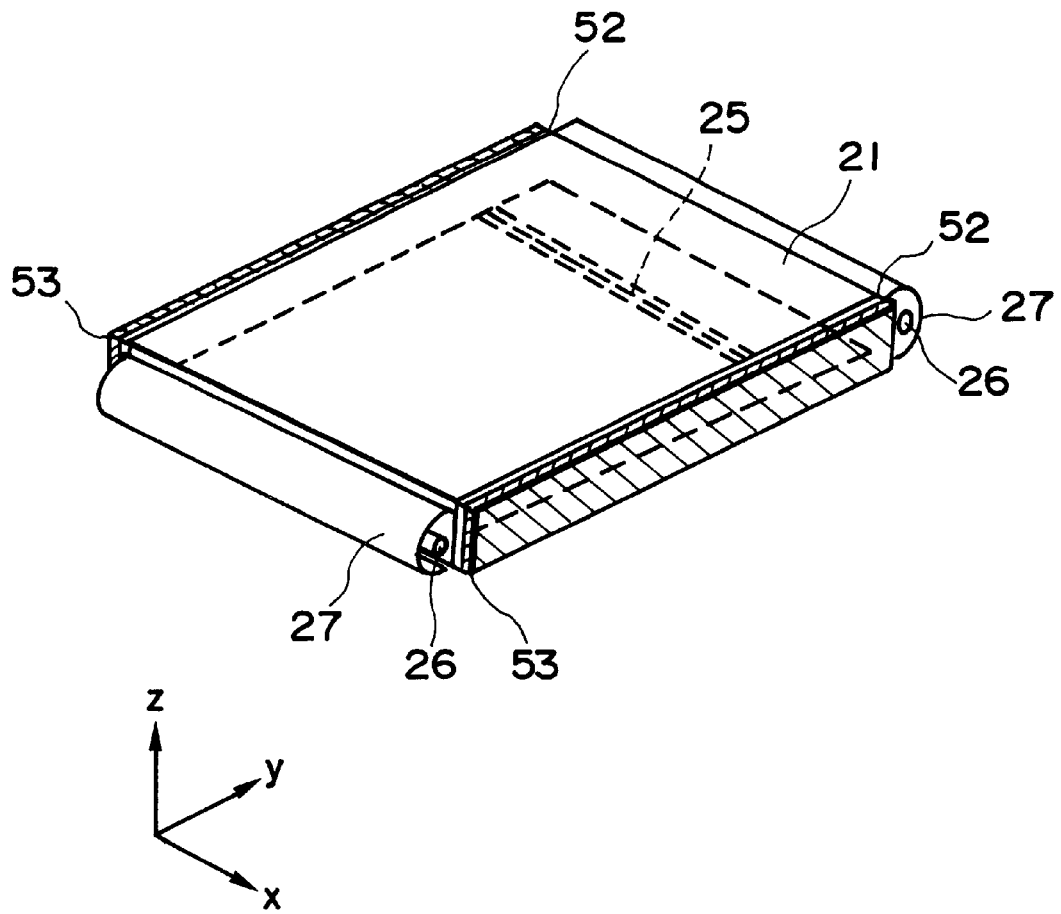
FIGS. 11 and 13 a perspective views for illustrating structures of fifth and seventh embodiments, respectively, of the invention.

Fifth embodiment is described with reference to FIG. 11.

In Second and Third embodiments described above, the phase plate 52 and the reflector 53 are disposed opposite to the cold cathode ray tube 26 with the light guide member 21 disposed therebetween. In this embodiment, a pair of cold cathode ray tubes (light sources) 26 are disposed opposite to each other so as to sandwich a light guide member 21, and a combination of a phase plate 52 and a reflector 53 is disposed on each of the remaining sides of the light guide member 21 so as to similarly sandwich the light guide member 21. In case where the light guide member has four sides of different lengths, it is preferred that the light sources 26 are disposed on shorter sides, and the combinations of the phase plate 52 and the reflector 53 are disposed on longer sides.

In this embodiment, light emitted from the light source 26 toward the reflector 53 is converted into s-polarized light, so that the illumination light quantity is increased to provide a high-luminance image.

Further, in this embodiment, the number of light sources is increased to provide an image of further increased luminance.

Further, as the light sources 26 are disposed at symmetrical positions, the symmetry of light quantity distribution is increased to provide an improved image quality.

Incidentally, from the viewpoints of high luminance and symmetry of light quantity distribution, it may be better to dispose light sources on all four sides of the light guide member 21. In other words, in case where all four sides are not provided with a light source, the light quantity distribution is lowered in the vicinity of a side not provided with the light source. In this embodiment, however, the sides not provided with the light source 26 are provided with reflectors 53, so that the lowering in light quantity distribution can be substantially obviated to provide an improved image quality.

Sixth Embodiment

Sixth embodiment is described with reference to FIG. 12.

In this embodiment, a phase plate (first phase device) 70 and a reflector (first reflector) 53 are disposed on a side of a light guide member 21, and the phase plate 70 is designed to have a wedge-shaped cross-section, so that the phase plate

70 and the light guide member have a boundary therebetween inclined with respect to the reflector surface 53. In other words, the phase plate 70 is designed to have a thickness which increases continuously in the Z-direction. The structure shown in FIG. 12 may be provided by cutting and polishing a side of the light guide member to provide an inclined side, and a phase plate 70 shaped into a wedge section is disposed along the inclined side.

A uniaxial or biaxial phase plate has a reciprocity characteristic so that the efficiency of phase shift (i.e., polarization conversion) is not necessarily good.

In this regard, in the previous embodiments, light is obliquely incident to the phase plate 52 to provide different forward and backward paths, so that the polarization conversion efficiency can be improved to some extent.

Figure 12:
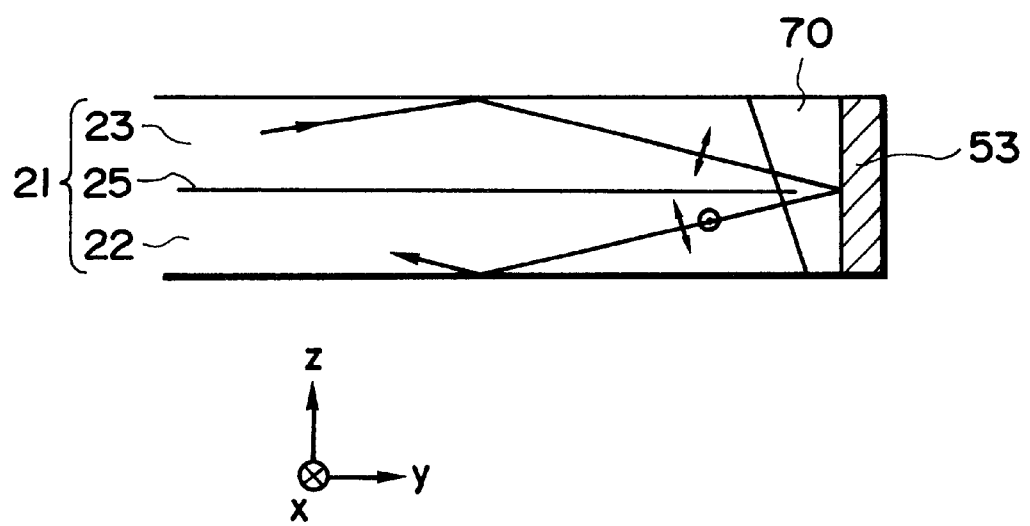

In this embodiment, the phase plate 70 has a thickness which varies in the thickness direction of the light guide member 21 as shown in FIG. 12, so that the anisotropy of the phase plate for polarized light can be positively changed between the forward path and the backward path to further improve the polarization conversion efficiency.

Seventh embodiment

Figure 13:
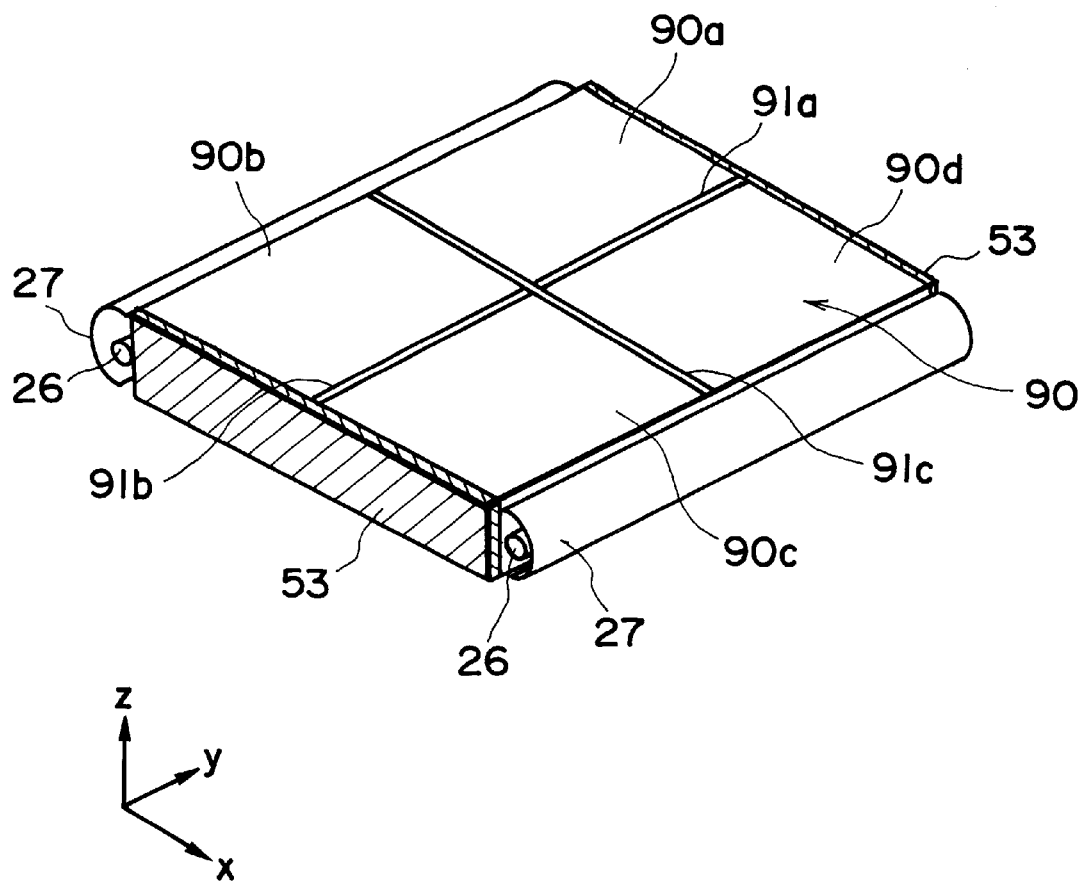
Figure 14:
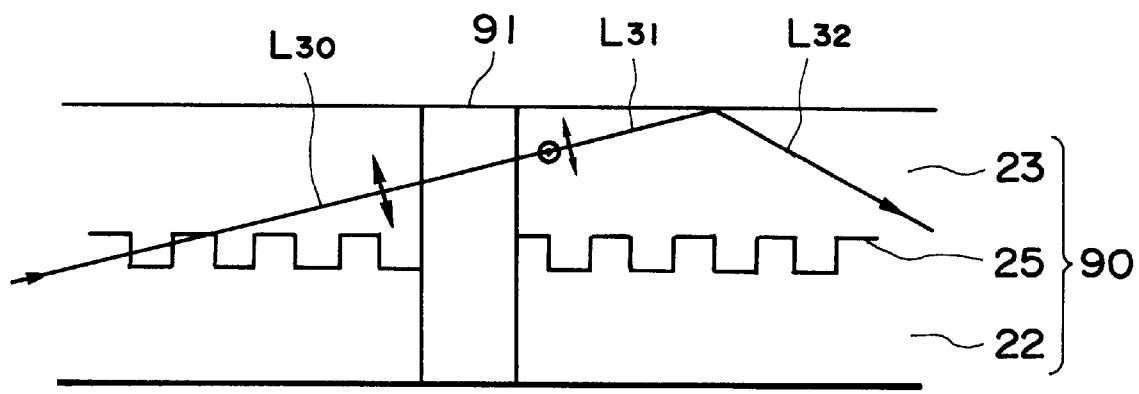
FIGS. 14, 16 and 17 are sectional views for illustrating light behavior in the seventh, and eighth embodiments, of the invention.

Seventh embodiment is described with reference to FIGS. 13 and 14.

In this embodiment, a light guide member 90 is divided into four sections (called light guide sections 90a, 90b, 90c and 90d), between which phase plates (first phase devices) 91a, 91b and 91c are inserted. Further, two cathode ray tubes 26 are disposed opposite to each other so as to sandwich the light guide member 90 along two sides thereof, and on the remaining two sides, two reflectors 53 are disposed so as to similarly sandwich the light guide member 90. Thus, in this embodiment, the phase plate 91a–91c are disposed within the light guide member 90 and separated from the reflectors 53. As shown in more detail in FIG. 14, the light guide member 90 is composed of an anisotropic substrate 22, a non-anisotropic layer 23 and an anisotropic grating 25 formed at the boundary therebetween.

In Third embodiment (FIG. 7) described above, light is reflected by the reflector 53 so as to passes twice through the phase plate 52. By contrast, in this embodiment, light passes through a phase plate only once. Accordingly, the phase plate 91 (91a–91c) is designed to have a thickness almost twice that of the phase plate 52.

In this embodiment, p-polarized light $L_{30}$ having passed through the anisotropic grating 25 is converted into elliptically polarized light which is close to s-polarized light. Thus, p-polarized light is converted into s-polarized light, which is utilized as illumination light, thereby allowing a high-luminance bright display.

Further, according to this embodiment, a planar light source capable of emitting linearly polarized light of a uniform light quantity distribution can be formed from cold cathode ray tubes 26 having an area and emitting light flux of random polarized light, thus providing a high-efficiency, thin and light-weight illumination device.

Further, according to this embodiment, illumination light for illuminating the liquid crystal panel is almost composed of s-polarized light, so that it is unnecessary to dispose a polarizer between the liquid crystal panel and the illumination device. As a result, light quantity loss due to the polarizer can be obviated to provide a good image of a higher luminance accordingly.

The phase plates 91 are disposed within the light guide member 90 but need not be disposed at positions as shown.

Eighth Embodiment

Eighth embodiment is described with reference to FIGS. 15–17.

Figure 15:
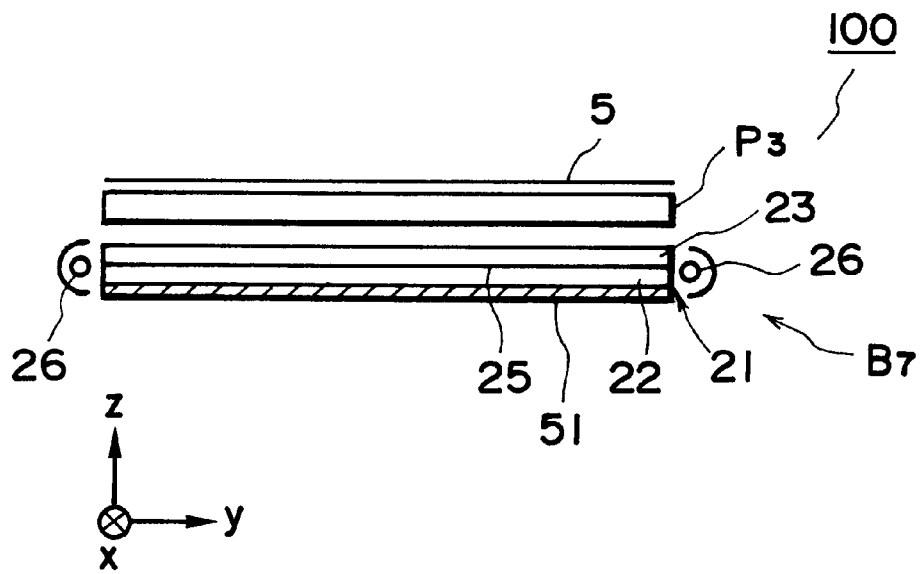

FIG. 15 is a schematic sectional view showing a structure of a transmission-type liquid crystal apparatus 100, which includes a transmission-type liquid crystal panel $P_3$, behind which an illumination device $B_7$ is disposed.

In Third embodiment (FIG. 7), on a side (not provided with a cold cathode ray tube 26 (light source)) of the light guide member 21, a phase plate 52 and a reflector 53 are disposed. In contrast, in this embodiment, both sides of a light guide member 21 are respectively provided with a light source 26, and a reflector (second reflector) 51 is disposed along a bottom surface of the light guide member 21.

Other structures are similar to those in Third embodiment, and the behavior of light emitted from the light sources 26 is similar except for differences accompanying the absence of the phase plate 52 and the reflector 53.

In this embodiment, the light sources 26 are disposed on both sides of the light guide member 21, so that the light quantity distribution from the illumination device becomes symmetrical to provide a liquid crystal apparatus of a better image quality.

Ninth Embodiment

Figure 18:
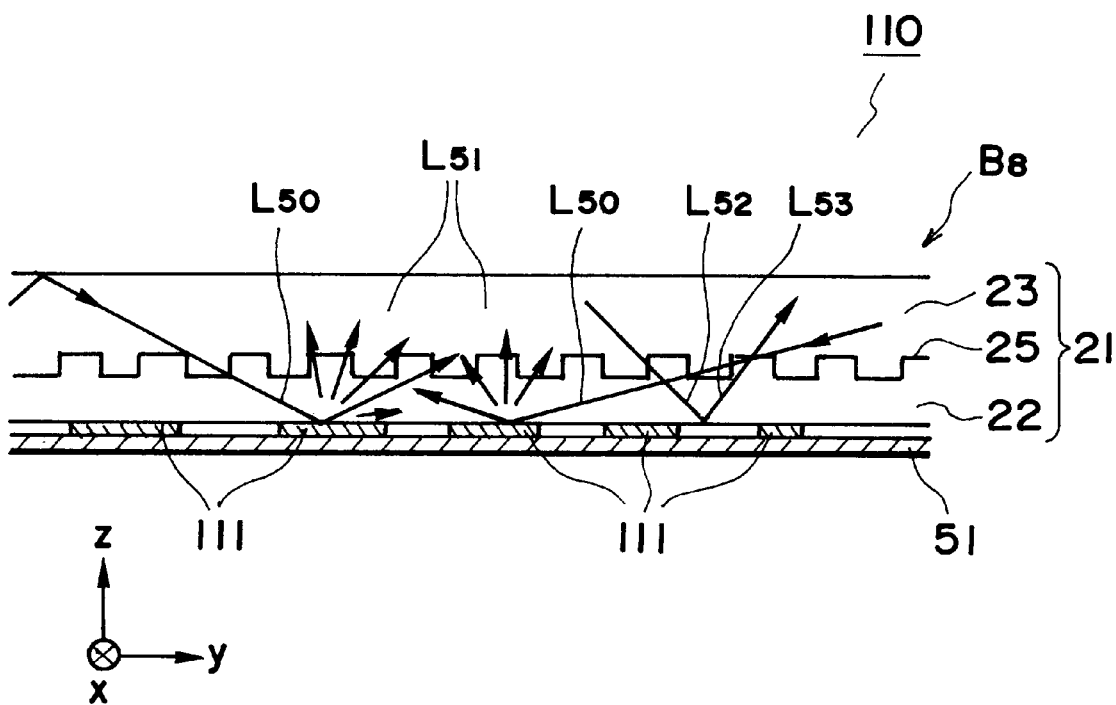
FIGS. 18–22 are sectional views for illustrating structures, etc., of liquid crystal apparatus according to ninth to thirteenth embodiments, respectively, of the invention.

Ninth embodiment is described with reference to FIG. 18.

A liquid crystal apparatus 110 according to this embodiment includes an illumination device $B_8$ for illuminating a transmission-type liquid crystal panel similarly as in Eighth embodiment.

The illumination device $B_8$ includes a light guide member 21 comprising an anisotropic substrate 22 and a non-anisotropic layer 23, and cold cathode ray tubes 26 (not shown) disposed on both sides of the light guide member 21.

Along the bottom or lower surface of the light guide member 21, a scattering layer 111 and a reflector (second reflector) 51 are formed. The reflector 51 is in the form of a sheet formed separately and, after being provided with the scattering layer 111 by application of a white ink, applied to the light guide member 21. The scattering layer 111 is formed by scattering regions each comprising a multitude of dispersed dots and distributed over the lower surface (x-y plane) of the light guide member 21.

Light emitted from the light sources 26 enters and passes through the light guide member 21 while being scattered by the scattering layer 111 (with a portion thereof being reflected by the reflector 51 after the scattering).

Then, light $L_{51}$ scattered by the scattering layer 111 is converted into s-polarization components due to polarization-conversion accompanying the scattering and birefringence function of the anisotropic substrate 22 to be incident to the alignment grating 25 at various incidence angles β and diffracted at various diffraction angles α. Then, a portion thereof is emitted from the light guide member 21 in the Z-axis direction to illuminate the liquid crystal panel.

In this embodiment, the size and density of ink spots constituting the scattering layer 111 and the size of the scattering layer 111 may be adjusted to provide an increased scattering performance, so as to minimize the incidence angle-dependence of scattered reflected light distribution, thereby providing a uniform light quantity distribution. As a result, the luminance of the liquid crystal panel is uniformized to provide an improved image quality.

The scattering layer 111 may be formed by printing on a reflective sheet as described above inexpensively and with a good durability.

The scattering layer 111 is formed by a multitude of scattering regions each composed of a number of spots. The areas of the respective scattering regions may be varied in consideration of distances from the light sources 26 so as to uniformize the light quantity distribution. Further, the scattering performance of the respective scattering regions may be adjusted in consideration of the distance from the light sources 26.

The scattering layer 111 can be directly formed on a surface of the light guide member, e.g., by etching, and the reflector 51 can be formed thereon, e.g., by vapor deposition.

Tenth Embodiment

Figure 19:
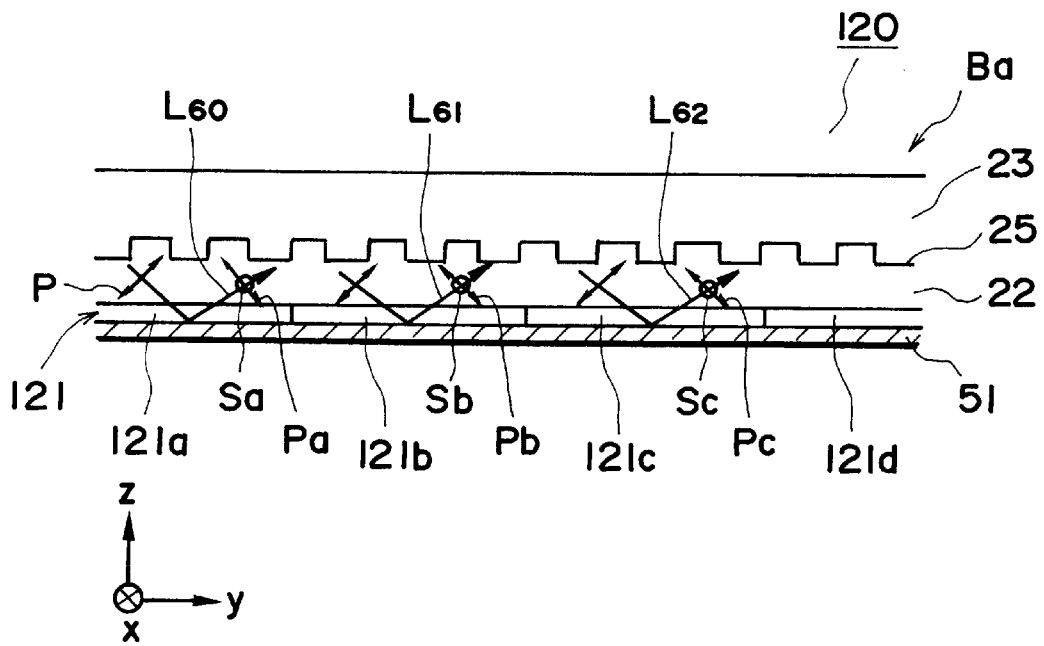

Tenth embodiment is described with reference to FIG. 19.

A liquid crystal apparatus 120 according to this embodiment includes an illumination device $B_9$ for illuminating a transmission-type liquid crystal panel similarly as in Ninth embodiment.

The illumination device $B_9$ includes a light guide member 21 comprising an anisotropic substrate 22 and a non-anisotropic layer 23, and light sources (not shown) disposed on both sides of the light guide member 21.

Along the lower surface of the light guide member 21, a wave plate (second phase device) 121 and a reflector (second reflector) 51 are formed. The wave plate 121 is formed of a stretched polycarbonate sheet so as to have a plurality of polarization phase shift regions 121a, 121b, 121c, 121d . . . , having a birefringence function. The amount of phase shift can be controlled by varying the degree of stretching to provide different orientations.

Light flux of p-polarization component emitted from a light source 26 and having passed through the anisotropic grating 25 enters a polarization phase shift region 121 and is then reflected by the reflector 51 to form light $L_{60}$. Because of the polarization conversion function of the phase shift region 121a and the birefringence function of the anisotropic substrate 22, the light flux 60 has been converted into s-polarized light and then enters the anisotropic grating 25. The phase change caused by the phase shift region 121a depends on the orientation of index ellipsoid in the phase shift region 121a, the angle of ray and the reciprocal optical path length. More specifically, an identical phase shift region 121a can provide the light flux $L_{60}$ with different proportions of p- and s-polarization components depending on the incidence angle inclusive of the agimuth, so that the rate of conversion from p-polarized light into s-polarized light can be controlled to a desired value with respect to a light flux incident to the upper surface of the light guide member 21 at an incidence angle of total reflection angle θc or smaller.

Then, a portion of the light (s-polarization component) is diffracted at the anisotropic grating 25 to be emitted from the light guide member 21 for illumination of the liquid crystal panel.

In this embodiment, the distribution of the polarization phase shift regions 121a, . . . along the x-y plane may be adjusted so as to uniformize the illumination light quantity distribution, thereby providing the liquid crystal panel with a uniform luminance and an improved image quality.

In this embodiment, a higher luminance is attained than in Ninth embodiment using the scattering layer 111.

Eleventh Embodiment

Figure 20:
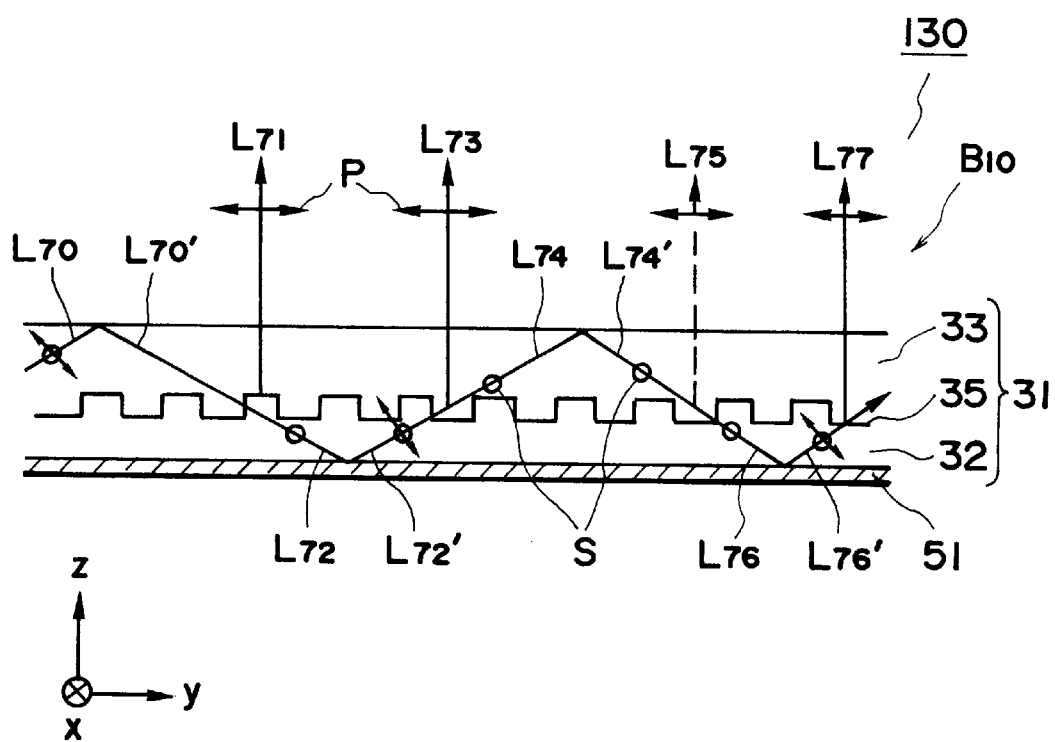

Eleventh embodiment is described with reference to FIG. 20.

A liquid crystal apparatus 130 according to this embodiment incudes an illumination device $B_{10}$ for illuminating a transmission-type liquid crystal panel similarly as in Eighth embodiment, behind which the illumination device $B_{10}$ is disposed. The illumination device $B_{10}$ includes a light guide member 31 similar to one used in Second embodiment and a light source (cold cathode ray tube, not shown) disposed on a side of the light guide member 31.

The light guide member 31 is composed as a laminate of an anisotropic substrate 32 and a non-anisotropic layer 33 forming a boundary therebetween at which an anisotropic grating 35 is formed. In this embodiment, the anisotropic grating 35 is arranged in a direction perpendicular to the optical axis of the substrate 32. As a result, s-polarized light is extraordinary ray and p-polarized light having an electric vector vibrating direction parallel to the drawing is ordinary ray. Further, in this embodiment, diffraction of ordinary ray (p-polarized light) is utilized, and the refractive index of the non-anisotropic layer 33 is matched with that of the anisotropic substrate 32 for extraordinary ray.

When, the liquid crystal apparatus 130 is driven, the liquid crystal panel is driven into a state suitable for displaying a prescribed image, and light $L_{70}$ emitted from the cold cathode ray tube 26 enters the light guide member 31 to cause repetitive total reflection within the light guide member 31.

During the repetition of total reflection, light $L_{70}$ is incident to the anisotropic grating 35 at an angle of Oc or more. At that time, only p-polarized light (ordinary ray) is diffracted by the anisotropic grating 35 toward the liquid crystal panel (upward in the figure) and s-polarized light $L_{72}$ is transmitted through the grating 35. The s-polarized light $L_{72}$ having passed through the anisotropic grating 35 is again subjected to birefringence by the anisotropic substrate 32 and reflected by a reflector 51 to be elliptically polarized light, of which p-polarized light component $L_{73}$ is diffraction-separated by the anisotropic grating 35. Further, s-polarized light $L_{74}$ having passed through the anisotropic grating 35 is not subjected to polarization conversion by the non-anisotropic layer 33 to be totally reflected at the upper boundary thereof and then passed through the anisotropic grating 35. At this time, if residual p-polarization component (fraction remaining without diffraction when having passed through the anisotropic grating 35) is present, it is diffracted when passing through the anisotropic grating 35. These phenomena are repeated thereafter.

When diffraction by a grating is considered in general, it is easier to have a high diffraction efficiency for s-polarized light, and it is unnecessary to use diffraction of p-polarized light as in this embodiment. However, in case of incorporating a reflection-type liquid crystal apparatus in apparatus, such as an electronic view finder and a head-mounted display, if only diffraction of s-polarized light can be used, it may be necessary to use a lens or mirror system for guiding linearly polarized light toward a viewer in some cases, thus making the entire apparatus complicated and expensive. In such a case, if diffraction of p-polarized light is used as in this embodiment, such a lens or mirror system can be unnecessitated to make the entire apparatus simplified and inexpensive.

Twelfth Embodiment

Figure 21:
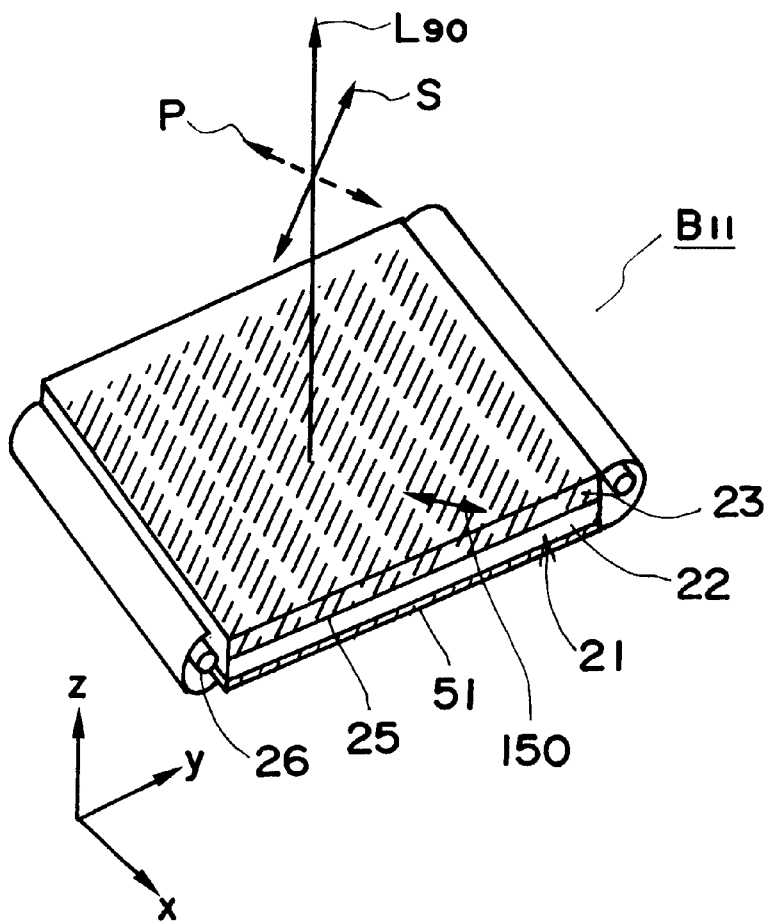

Twelfth embodiment will be described with reference to FIG. 21.

In this embodiment, the arrangement direction of an anisotropic grating 25 is taken in a direction denoted by a two-headed arrow 150 which forms an angle of 45 deg. with a pixel arrangement direction of a liquid crystal panel (not shown) used in combination therewith. Further, the optical axis of the anisotropic substrate 22 is taken parallel to the arrangement direction 150 of the anisotropic grating 25, and the refractive index is matched with the refractive index of the anisotropic substrate 22 for extraordinary ray.

In a small-sized liquid crystal panel having a diagonal size of ca. 1 inch as used in an electric view finder, etc., a small pixel pitch on the order of several tens $\mu$m is generally used, and an alignment failure is liable to be caused during the production process. In this embodiment, however, the arrangement direction of the anisotropic grating 25 is set in the above-described manner, so that the image quality is less affected by such alignment defects.

A similar effect may be attained by inserting a halfwave plate between the illumination device $B_{11}$ and the liquid crystal panel so as to adjust a polarization direction without resorting to the arrangement used in this embodiment. However, as an ordinary halfwave plate cannot cover a white visible region, linearly polarized light having a uniform azimuth cannot be obtained over wavelength regions used, thus being liable to result in color deviation. The arrangement in this embodiment can obviate such a problem.

Thirteenth Embodiment

Figure 22:
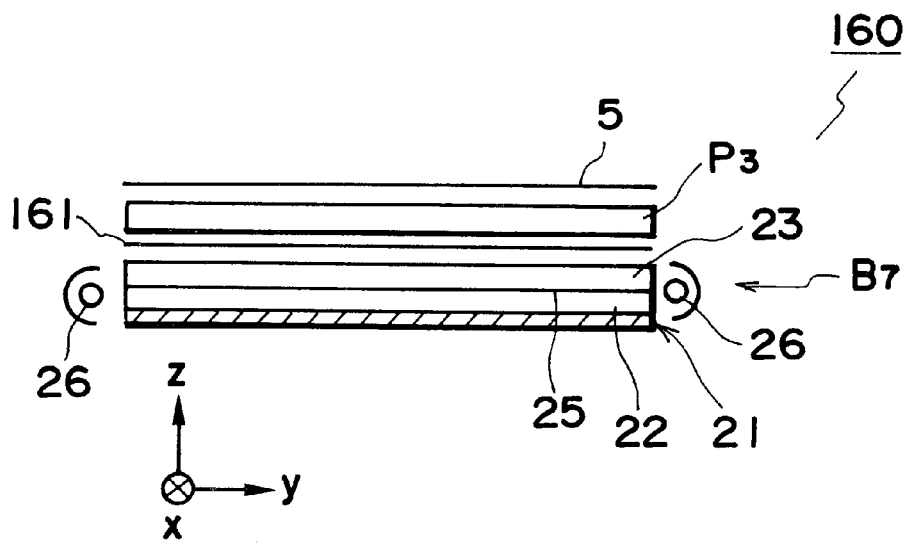

Thirteenth embodiment is described with reference to FIG. 22.

Figure 16:
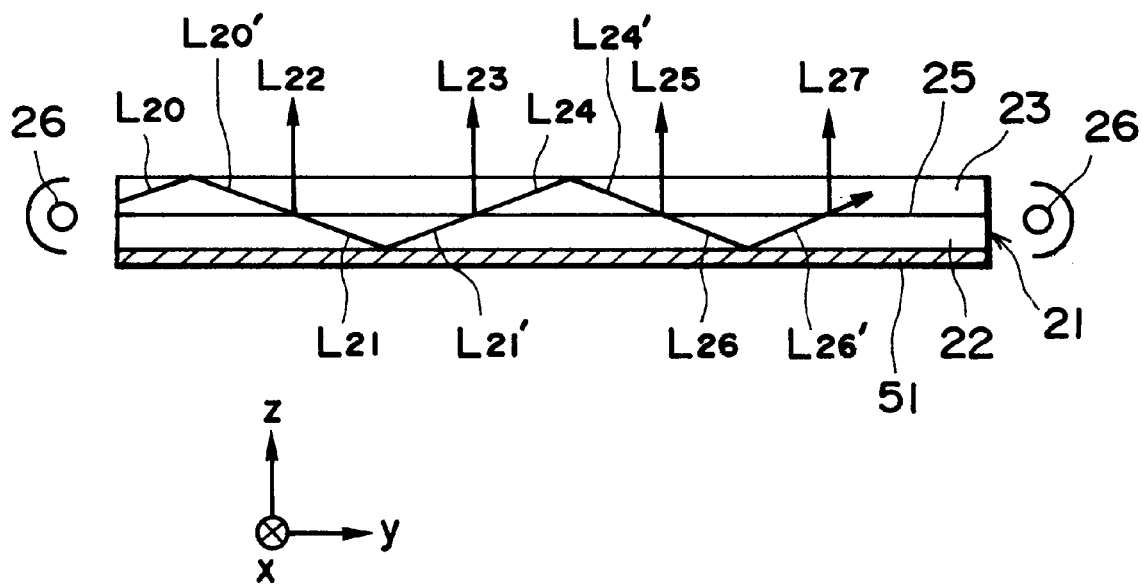
Figure 17:
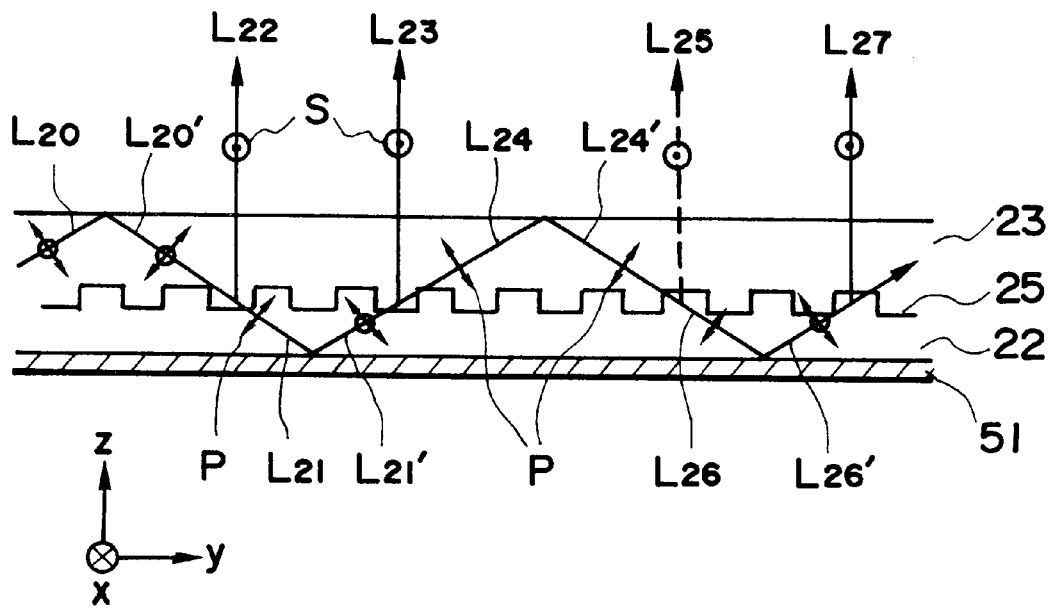

A liquid crystal apparatus 160 according to this embodiment includes a polarizer 161 between a transmission-type liquid crystal panel $P_3$ and an illumination device $B_7$ but other structures are similar to those in Eighth embodiment (FIGS. 15–17).

In this embodiment, light incident to an upper boundary (with external air) of non-anisotropic layer 23 at an incidence angle larger than the total reflection angle θc is totally reflected at the boundary similarly as in Third embodiment, etc. However, a light flux at an incidence angle smaller than the total reflection angle θc is not subjected to such total reflection and can be emitted as it is from the light guide member 21. Such leakage light is caused accompanying the presence of higher-order diffraction light and a deviation in matching of refractive index. The leakage light causes defects, such as flare and ghost in the image on the liquid crystal panel, thereby causing a lowering in contrast and deterioration in image quality.

In this embodiment, however, the polarizer 161 has a transmission axis in alignment with the polarization direction of polarized light incident to the liquid crystal panel $P_3$, so that undesirable polarization component accompanying the leakage light is removed. As a result, it becomes possible to prevent the occurrence of image defects, such as flare and ghost, and a lowering in contrast, thereby retaining a good image quality.

The provision of such a polarizer results in a lowering in light transmittance to some extent but, in this embodiment, since the luminance level has been raised to twice a large as that in a conventional apparatus, by use of the anisotropic grating 25, etc., an adverse effect thereof onto the image quality is almost negligible.

As described above, according to the present invention, light emitted from a light source is transmitted through an anisotropic member while being polarization-converted, and a portion thereof is diffracted to be utilized as illumination light. By repetition of such phenomena, the illumination device of the present invention provides an increased illumination quantity and provides a liquid crystal apparatus with an improved luminance of display image.

What is claimed is:

1. An illumination device, comprising: a light-transmissive light guide member, and a light source disposed on a side of the light guide member to emit light to the light guide member;
   wherein the light guide member includes an anisotropic grating.

2. An illumination device according to claim 1, wherein said light guide member comprises an anisotropic member having a refractive index anisotropy.

3. An illumination device according to claim 1, wherein said anisotropic grating is a one-dimensionally arranged grating and has a refractive index distribution in its arrangement direction; said refractive index distribution is periodical for linearly polarized light having an electric vector-vibrating direction perpendicular to the arrangement direction and substantially uniform for linearly polarized light having an electric vector-vibrating direction parallel to the arrangement direction.

4. An illumination device according to claim 1, wherein said anisotropic grating is a one-dimensionally arranged grating and has a refractive index distribution in its arrangement direction; said refractive index distribution is periodical for linearly polarized light having an electric vector-vibrating direction parallel to the arrangement direction and substantially uniform for linearly polarized light having an electric vector-vibrating direction perpendicular to the arrangement direction.

5. An illumination device according to any of claims 1–4, wherein the light guide member comprises an anisotropic member having a refractive index anisotropy, and a non-anisotropic member having a refractive index anisotropy smaller than that of the anisotropic member laminated on the anisotropic member so as to form the anisotropic grating at the boundary between the anisotropic member and the non-anisotropic member.

6. An illumination device according to claim 1, wherein a reflector is disposed on a back surface of the light guide member.

7. An illumination device according to any of claims 1–4, further comprising:
   a first reflector disposed on a side of the light guide member for reflecting light emitted from the light source and transmitted through the light guide member, and
   a first phase device disposed on a path of the light emitted from the light source and subjecting the light to polarization conversion.

8. An illumination device according to claim 7, herein said first phase device is disposed along said first reflector.

9. An illumination device according to claim 8, wherein said first reflector is disposed opposite to the light source with the light guide member disposed therebetween.

10. An illumination device according to claim 9, wherein said first phase device has a wedge-shaped cross-section and provides a boundary with the light guide member; the boundary being inclined with respect to the first reflector.

11. An illumination device according to claim 7, wherein said light source is disposed in a pair so as to sandwich the light guide member, said first reflector is disposed in a pair so as to sandwich the light guide member, and said first phase device is disposed within the light guide member so as to be separated from the first reflector.

12. A liquid crystal apparatus, comprising: an illumination device emitting light, and a liquid crystal device illuminated by the light emitted from the illumination device;
   wherein said illumination device is disposed along the liquid crystal device and includes a light-transmissive light guide member, and a light source disposed on a side of the light guide member to emit light to the light guide member; the light guide member including an anisotropic grating.

13. A liquid crystal apparatus according to claim 12, wherein said light guide member comprises an anisotropic member having a refractive index anisotropy.

14. A liquid crystal apparatus according to claim 13, wherein said anisotropic grating is a one-dimensionally arranged grating and has a refractive index distribution in its arrangement direction; said refractive index distribution is periodical for linearly polarized light having an electric vector-vibrating direction perpendicular to the arrangement direction and substantially uniform for linearly polarized light having an electric vector-vibrating direction parallel to the arrangement direction.

15. A liquid crystal apparatus according according to claim 13, wherein said anisotropic grating is a one-dimensionally arranged grating and has a refractive index distribution in its arrangement direction; said refractive index distribution is periodical for linearly polarized light having an electric vector-vibrating direction parallel to the arrangement direction and substantially uniform for linearly polarized light having an electric vector-vibrating direction perpendicular to the arrangement direction.

16. A liquid crystal apparatus according to any of claims 13–15, wherein said anisotropic grating is a one-dimensionally arranged grating having an arrangement pitch, and said light crystal device comprises a matrix of pixels including pixels arranged in the arrangement direction of the anisotropic grating at a larger pitch than the alignment pitch of the anisotropic grating.

17. A liquid crystal apparatus according to according to any of claims 13–15, wherein the light guide member comprises an anisotropic member having a refractive index anisotropy, and a non-anisotropic member having a refractive index anisotropy smaller than that of the anisotropy laminated on the anisotropic member so as to form the anisotropic grating at the boundary between the anisotropic member and the non-anisotropic member.

18. A liquid crystal apparatus according to claim 12, wherein a reflector is disposed on a back surface of the light guide member.

19. A liquid crystal apparatus according to any of claims 13–15, wherein said liquid crystal device comprises a liquid crystal layer, and a color filter layer disposed closer to the light guide member than the liquid crystal layer.

20. A liquid crystal apparatus according to any of claim 13–15, further comprising a polarization analyzer means on a viewer side of the light guide member.

21. A liquid crystal apparatus, comprising: an illumination device emitting light, and a liquid crystal device illuminated by the light from the illumination device to allow selective transmission of the light therethrough for data display, wherein said illumination device is disposed long the liquid crystal device and includes a light-transmissive light guide member, and a light source disposed on a side of the light guide member to emit light to the light guide member; the light guide member including an anisotropic grating and provided with a reflector disposed opposite to the liquid crystal device with respect to the light guide member disposed therebetween.

22. A liquid crystal apparatus according to claim 21, wherein said anisotropic grating is a one-dimensionally arranged grating and has a refractive index distribution in its arrangement direction; said refractive index distribution is periodical for linearly polarized light having an electric vector-vibrating direction perpendicular to the arrangement direction and substantially uniform for linearly polarized light having an electric vector-vibrating direction parallel to the arrangement direction.

23. A liquid crystal apparatus according to claim 21, wherein said anisotropic grating is a one-dimensionally arranged grating and has a refractive index distribution in its arrangement direction; said refractive index distribution is periodical for linearly polarized light having an electric vector-vibrating direction parallel to the arrangement direction and substantially uniform for linearly polarized light having an electric vector-vibrating direction perpendicular to the arrangement direction.

24. A liquid crystal apparatus according to any of claims 21–23, further including a light-scattering layer between the reflector and the light guide member.

25. A liquid crystal apparatus according to any of claims 21–23, further including a phase device disposed between the reflector and the light guide member, for subjecting light incident thereto to polarization conversion.

26. A liquid crystal apparatus according to any of claims 21–23, further including a polarizer disposed between the light guide member and the liquid crystal device, for removing unnecessary polarization component leaked out of the light guide member.

* * * * *

UNITED STATES PATENT AND TRADEMARK OFFICE
CERTIFICATE OF CORRECTION

PATENT NO. : 6,020,944
DATED : February 1, 2000
INVENTOR(S) : HIROAKI HOSHI

It is certified that error appears in the above-identified patent and that said Letters Patent is hereby corrected as shown below:

COLUMN 2:

Line 24, "as (low" should read --(as low--.

COLUMN 3:

Line 66, "seventh," should read --seventh-- and "embodiments," should read --embodiments--.

COLUMN 22:

Line 48, "herein" should read --wherein--.

COLUMN 23:

Line 33, "according to" (second occurrence) should be deleted.

Signed and Sealed this

Fifteenth Day of May, 2001

Attest:

NICHOLAS P. GODICI

*Attesting Officer*       *Acting Director of the United States Patent and Trademark Office*